US009734355B2

(12) United States Patent
Oxford

(10) Patent No.: US 9,734,355 B2
(45) Date of Patent: Aug. 15, 2017

(54) SYSTEM AND METHOD FOR AN EFFICIENT AUTHENTICATION AND KEY EXCHANGE PROTOCOL

(71) Applicant: Rubicon Labs, Inc., San Francisco, CA (US)

(72) Inventor: William V. Oxford, Austin, TX (US)

(73) Assignee: Rubicon Labs, Inc., San Francisco, CA (US)

( * ) Notice: Subject to any disclaimer, the term of this patent is extended or adjusted under 35 U.S.C. 154(b) by 205 days.

(21) Appl. No.: 14/683,988

(22) Filed: Apr. 10, 2015

(65) Prior Publication Data

US 2015/0295713 A1    Oct. 15, 2015

Related U.S. Application Data

(60) Provisional application No. 61/978,657, filed on Apr. 11, 2014, provisional application No. 61/978,669, filed on Apr. 11, 2014.

(51) Int. Cl.
*H04L 9/32* (2006.01)
*G06F 21/78* (2013.01)
(Continued)

(52) U.S. Cl.
CPC .............. *G06F 21/78* (2013.01); *G06F 21/72* (2013.01); *H04L 9/0816* (2013.01);
(Continued)

(58) Field of Classification Search
CPC . H04L 63/0435; H04L 63/062; H04L 9/0802; H04L 9/0816; H04L 9/0819; H04L 9/083; H04L 9/0838; H04L 9/0841
See application file for complete search history.

(56) References Cited

U.S. PATENT DOCUMENTS 7,203,844 B1    4/2007 Oxford
7,673,142 B2    3/2010 Jeffries et al.
(Continued)

FOREIGN PATENT DOCUMENTS

WO    WO2013/142517    9/2013

OTHER PUBLICATIONS

Pornin, T., "Deterministic Usage of the Digital Signature Algorithm (DSA) and Elliptical Curve Digital Signature Algorithm (ECDSA)", Aug. 2013, IETF Trust, ISSN: 2070-1721.*

(Continued)

*Primary Examiner* — Daniel Potratz
(74) *Attorney, Agent, or Firm* — Sprinkle IP Law Group

(57) ABSTRACT

Embodiments of systems and methods disclosed herein provide a simple and effective method for authentication and key exchange that is secure from man-in-the-middle attacks and is characterized by perfect forward secrecy. More specifically, in certain embodiments, the systems and methods are disclosed that enable secure communications between a local device and a remote device(s) via a protocol that uses a Central Licensing Authority that shares derived secrets with the endpoints, without sharing the secrets themselves. The derived secrets may be comprised of public information, taking the form of nonces, in order to protect the system against replay-style attacks. Each endpoint can generate its own nonce with sufficient entropy such that neither endpoint is dependent on the trustworthiness of the other.

33 Claims, 12 Drawing Sheets

(51) Int. Cl.
*G06F 21/72* (2013.01)
*H04L 9/08* (2006.01)
*H04L 29/06* (2006.01)
*H04W 12/04* (2009.01)
*H04W 12/06* (2009.01)

(52) U.S. Cl.
CPC .......... *H04L 9/0861* (2013.01); *H04L 9/0894* (2013.01); *H04L 9/321* (2013.01); *H04L 9/3242* (2013.01); *H04L 63/0435* (2013.01); *H04L 63/0478* (2013.01); *H04L 63/0485* (2013.01); *H04L 63/06* (2013.01); *H04L 63/061* (2013.01); *H04W 12/04* (2013.01); *H04W 12/06* (2013.01); *H04L 9/083* (2013.01); *H04L 2463/061* (2013.01)

(56) References Cited

U.S. PATENT DOCUMENTS

| | | |
|---|---|---|
| 8,214,654 B1 | 7/2012 | Wyatt |
| 2004/0123312 A1 | 6/2004 | Kimura |
| 2008/0095361 A1* | 4/2008 | Wifvesson ............ H04L 9/0841 380/44 |
| 2008/0247540 A1 | 10/2008 | Ahn |
| 2008/0282345 A1 | 11/2008 | Beals |
| 2009/0064125 A1* | 3/2009 | Venkatachalam ......... G06F 8/65 717/170 |
| 2009/0157936 A1 | 6/2009 | Goss |
| 2010/0122088 A1 | 5/2010 | Oxford |
| 2011/0235806 A1 | 9/2011 | Fukuda |
| 2013/0073850 A1 | 3/2013 | Zaverucha |
| 2014/0236842 A1 | 8/2014 | Salminen |
| 2015/0019868 A1* | 1/2015 | Lee ..................... H04L 9/0847 713/170 |
| 2015/0294123 A1 | 10/2015 | Oxford |
| 2016/0065362 A1* | 3/2016 | Choyi .................. H04L 63/065 380/279 |

OTHER PUBLICATIONS

International Search Report issued for PCT Application No. PCT/US2015/025410, mailed Jul. 23, 2015, 7 pages.
International Search Report issued for PCT Application No. PCT/US2015/025401, mailed Jul. 23, 2015, 8 pages.
International Preliminary Report on Patentability (Ch. I) and Written Opinion for International Patent Application No. PCT/US2015/025410, mailed Oct. 20, 2016, 6 pgs.
International Preliminary Report on Patentability (Ch. I) and Written Opinion for International Patent Application No. PCT/US2015/025401, mailed Oct. 20, 2016, 7 pgs.
Office Action for U.S. Appl. No. 14/683,924, mailed Mar. 8, 2017, 31 pgs.

* cited by examiner

SYSTEM AND METHOD FOR AN EFFICIENT AUTHENTICATION AND KEY EXCHANGE PROTOCOL

RELATED APPLICATIONS

This application claims a benefit of priority under 35 U.S.C. §119 to U.S. Provisional Patent Application No. 61/978,657, filed Apr. 11, 2014, entitled "SYSTEM AND METHOD FOR AN EFFICIENT AUTHENTICATION AND KEY EXCHANGE PROTOCOL," by William V. Oxford and to U.S. Provisional Patent Application No. 61/978,669, filed Apr. 11, 2014, entitled "SYSTEM AND METHOD FOR SHARING DATA SECURELY," by William V. Oxford, which are hereby fully incorporated by reference in their entirety.

TECHNICAL FIELD

This disclosure relates in general to security in computer systems. More specifically, this disclosure relates to encryption key exchange. Even more particularly, embodiments relate to an efficient and secure authentication and key exchange protocol.

BACKGROUND

In the emerging Internet of Things (IoT) market, it is often desired to remotely control or wirelessly communicate with a variety of relatively simple, relatively inexpensive, low power devices. As such, there is a need for a means to transfer data in a secure manner between large numbers of such devices. Furthermore, due to the typical usage pattern for such devices (e.g., real-time updates of sensor readings, etc.), the data exchange pattern between such devices is mostly small, frequent data updates rather than infrequent transfers of large data sets.

The standard method for accomplishing secure data transfer between such devices employs two phases: an authentication and key exchange (AKE) phase and an encrypted data transfer phase. As implied by its name, the first phase involves the two steps: first, the communicating devices must assure each other that they each know with whom they are communicating (authentication) and then they must jointly agree upon a shared key that they can both use in the second phase. This second phase is where the actual secure data transfer happens, but it cannot proceed without successful completion of the first phase. It is desirable that the overall protocol be constructed in such a manner to ensure that the exchange can be free from both eavesdropping and/or interference by any unauthorized external party.

Unfortunately, using standard methods, this AKE phase cannot be completed without using asymmetric cryptography somewhere in the process. The computational load required due to the nature of the asymmetric cryptography mathematics is quite large; in fact it is several orders of magnitude larger than the amount of computation required to encrypt and decrypt the message traffic in the second phase.

This large computational load poses a problem for both the low-power requirements of the IoT device space as well as being highly inefficient in the case where the message data that must be transmitted in the second phase is small. Thus, there is a need for a protocol where the AKE phase does not require the use of asymmetric cryptography in order to securely arrive at a shared key between devices.

SUMMARY

Embodiments of systems and methods for providing a simple and effective method for authentication and key exchange that is secure from man-in-the-middle attacks and is characterized by perfect forward secrecy are disclosed.

In particular, in one embodiment, methods for providing secure communications between a local device and a remote device include receiving an encrypted Message Authentication Code (MAC) based on a nonce received from the remote device and the remote device's private key, wherein the decryption key for this encrypted MAC is derived from a private key of the local device. An encrypted key message is also received from a third party, wherein the decryption key for this encrypted key message is derived from the private key of the local device and a nonce received from the third party. The (decrypted) key message from the third party then contains a second MAC that is derived from the private key of the remote device. This second MAC is used as the key input to a third keyed hash function, producing a resulting third MAC. This third MAC value is either concatenated or XOR-ed with a fourth MAC (one that is derived from the local device's private key and a locally-generated nonce). This concatenated or XOR-ed data is then used as the input to a final Hash function, the output of which forms a session key that is thus based on the private keys of both the local and the remote devices. The generated session key is used to symmetrically encrypt and decrypt communications between the local device and the remote device.

In other embodiments, methods for providing secure communications between a local device and a remote device include receiving a nonce from a third party, wherein the nonce from the third party is derived from a private key of the local device and a private key of the remote device. An encrypted key is also received from the third party, wherein the encrypted key from the third party is derived from the private key of the remote device. A session key is generated using the nonce, the encrypted key from the third party, and an embedded secret of the local device. The generated session key is used to symmetrically encrypt and decrypt communications between the local device and the remote device.

In other embodiments, a computer program product comprising at least one non-transitory computer-readable storage medium storing computer instructions translatable by one or more processors to perform: receiving an encrypted Message Authentication Code (MAC) based on a nonce received from the remote device and the remote device's private key, wherein the decryption key for this encrypted MAC is derived from a private key of the local device. An encrypted key message is also received from a third party, wherein the decryption key for this encrypted key message is derived from the private key of the local device and a nonce received from the third party. The (decrypted) key message from the third party then contains a second MAC that is derived from the private key of the remote device. This second MAC is used as the key input to a third keyed hash function, producing a resulting third MAC. This third MAC value is either concatenated or XOR-ed with a fourth MAC (one that is derived from the local device's private key and a locally-generated nonce). This concatenated or XOR-ed data is then used as the input to a final Hash function, the output of which forms a session key that is thus based on the private keys of both the local and the remote devices. The generated session key is used to symmetrically encrypt and decrypt communications between the local device and the remote device.

In other embodiments, a computer program product comprising at least one non-transitory computer-readable storage medium storing computer instructions translatable by one or more processors to perform: receiving a nonce from a third party, wherein the nonce from the third party is derived from a private key of a local device and a private key of a remote device; receiving an encrypted key from the third party, wherein the encrypted key from the third party is derived from the private key of the remote device; generating a session key using the nonce, the encrypted key from the third party, and an embedded secret of the local device; and using the generated session key to symmetrically encrypt and decrypt communications between the local device and the remote device.

In other embodiments, a hardware security module is provided with a processor and at least one non-transitory computer-readable storage medium. The storage medium stores computer instructions translatable by the processor to perform: receiving an encrypted Message Authentication Code (MAC) based on a nonce received from the remote device and the remote device's private key, wherein the decryption key for this encrypted MAC is derived from a private key of the local device. An encrypted key message is also received from a third party, wherein the decryption key for this encrypted key message is derived from the private key of the local device and a nonce received from the third party. The (decrypted) key message from the third party then contains a second MAC that is derived from the private key of the remote device. This second MAC is used as the key input to a third keyed hash function, producing a resulting third MAC. This third MAC value is either concatenated or XOR-ed with a fourth MAC (one that is derived from the local device's private key and a locally-generated nonce). This concatenated or XOR-ed data is then used as the input to a final Hash function, the output of which forms a session key that is thus based on the private keys of both the local and the remote devices. The generated session key is used to symmetrically encrypt and decrypt communications between the local device and the remote device.

In other embodiments, a hardware security module is provided with a processor and at least one non-transitory computer-readable storage medium. The storage medium stores computer instructions translatable by the processor to perform: receiving a nonce from a third party, wherein the nonce from the third party is derived from a private key of a local device and a private key of a remote device; receiving an encrypted key from the third party, wherein the encrypted key from the third party is derived from the private key of the remote device; generating a session key using the nonce, the encrypted key from the third party, and an embedded secret of the local device; and using the generated session key to symmetrically encrypt and decrypt communications between the local device and the remote device.

Additionally, embodiments of systems are presented which embody these types of methodologies in computer systems, hardware, and software. It should be noted that the same hardware implementation could potentially be used to implement any one or combination of the entire range of solutions, depending on the requirements of the software.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the disclosure in detail. It should be understood, however, that the detailed description and the specific examples, while indicating some embodiments of the disclosure, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As will be discussed in greater detail below, embodiments provide a simple and effective method for authentication and key exchange that is secure from man-in-the-middle attacks and is characterized by perfect forward secrecy with the assumption that the management service (referred to as the Central Licensing Authority or CLA) is itself secure.

The SHA based AKE or SHAAKE protocol in accordance with embodiments operates in a similar manner to a number of "shared secret" AKE protocols, but it does not explicitly share a secret between the endpoints. In operation, the SHAAKE protocol uses a CLA that does have the ability to access the secret for each of the endpoints. However, the CLA does not share that secret with the endpoints, but rather it shares a derived secret from that secret. This derived secret is the MAC (i.e., the output of a Hash function) resulting from the secret and some other (public) piece of information. Thus, there is no requirement that any endpoint be able to have access to any other's secret in order to communicate securely. The public information can take the form of a set of nonces, in order to protect the system against replay-style attacks. Each endpoint can generate its own nonce with sufficient entropy such that neither endpoint is dependent on the trustworthiness of the other.

Figure 1:
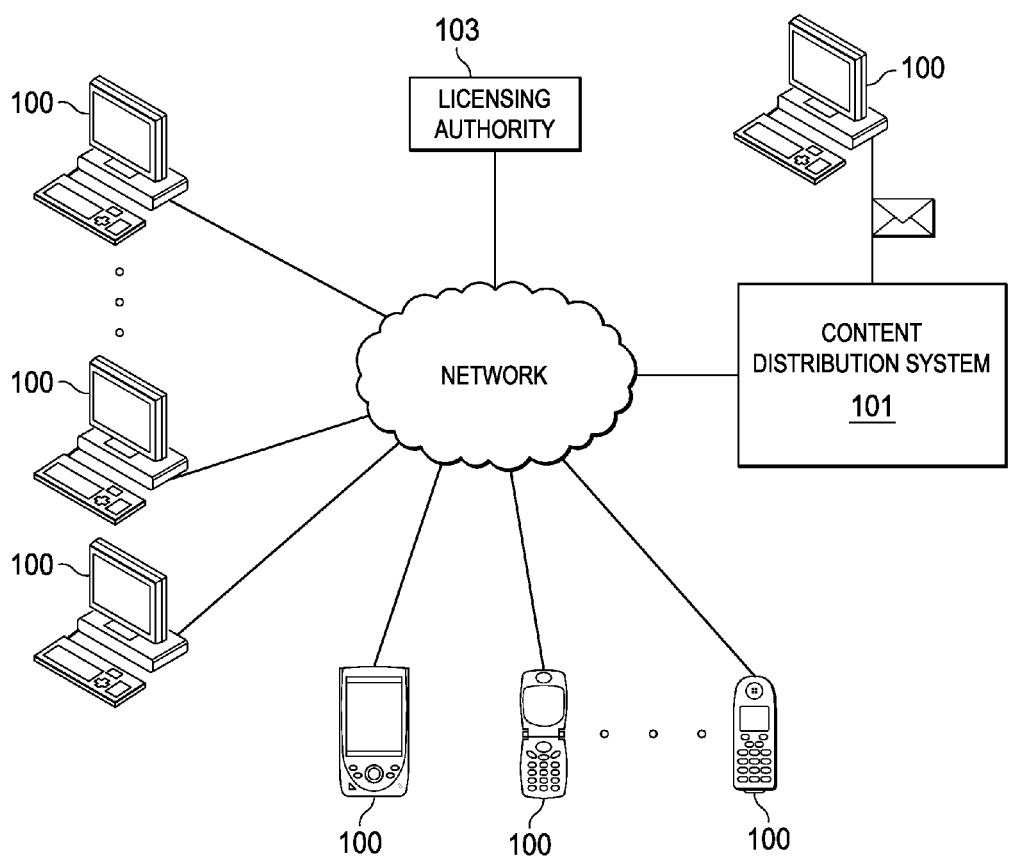
FIG. 1 depicts one embodiment of an architecture for content distribution.

Before discussing embodiments in more detail, it may be helpful to give a general overview of an architecture in which embodiments of the present disclosure may be effectively utilized. FIG. 1 depicts one embodiment of such a topology. Here, a content distribution system 101 may operate to distribute digital content (which may be for example, a bitstream comprising audio or video data, a software application, etc.) to one or more target units 100 (also referred to herein as target or endpoint devices) which comprise protocol engines. Examples other than the exemplary content distribution systems are also possible. These target units may be part of, for example, computing devices on a wireline or wireless network or a computer device which is not networked, such computing devices including, for example, a personal computers, cellular phones, personal data assistants, tablets, media players which may play content delivered as a bitstream over a network or on a computer readable storage media that may be delivered, for example, through the mail, etc. This digital content may compose or be distributed in such a manner such that control over the execution of the digital content may be controlled and security implemented with respect to the digital content.

In certain embodiments, control over the digital content may be exercised in conjunction with a licensing authority 103. Although this licensing authority 103 is referred to as the CLA, it will be understood that such a licensing authority need not be centralized. The CLA function may either be distributed using well-known methods, or alternately the CLA function may be accomplished by a content distribution system 101, including distribution of service data on a hardware device such as a memory stick, etc. in order to provide a key and/or an authorization code to a local target device. This key may be a compound key (DS), that is both cryptographically dependent on the digital content distributed to the target device and bound to each target device (TDn). In one example, a target device may be attempting to execute an application in secure mode. This secure application (which may be referred to as candidate code or a candidate code block (e.g., CC)) may be used in order to access certain digital content.

Accordingly, to enable a candidate code block to run in secure mode on the processor of a particular target device 100 to which the candidate code block is distributed, the licensing authority 103 supplies a correct value of a compound key (one example of which may be referred to as an Authorization Code) to the target device on which the candidate code block is attempting to execute in secure mode (e.g., supply DS1 to TD1). No other target device (e.g., TDn, where TDn≠TD1) can run the candidate code block correctly with the compound key (e.g., DS1) and no other compound key (DSn assuming DSn≠DS1) will work correctly with that candidate code block on that target device 100 (e.g., TD1).

As will be described in more detail below, when Target Device 100 (e.g., TD1) loads the candidate code block (e.g., CC1) into its instruction cache (and, for example, if CC1 is identified as code that is intended to be run in secure mode), the target device 100 (e.g., TD1) engages a hash function (which may be hardware based) that creates a message digest (e.g., MD1) of that candidate code block (e.g., CC1). The seed value for this hash function is the secret key for the target device 100 (e.g., TD1's secret key (e.g., SK1)).

In fact, such a message digest (e.g., MD1) may be a Message Authentication Code (MAC) as well as a compound key, since the hash function result depends on the seed value of the hash, the secret key of the target device 100 (e.g., SK1). Thus, the resulting value of the message digest (e.g., MD1) is cryptographically bound to both the secret key of the target device 100 and to the candidate code block. If the licensing authority distributed compound key (e.g., DS1) matches the value of the message digest (e.g., MD1) it can be assured that the candidate code block (e.g., CC1) is both unaltered as well as authorized to run in secure mode on the target device 100 (e.g., TD1). The target device 100 can then run the candidate code block in secure mode.

As can be seen then, in one embodiment, when secure mode execution for a target device 100 is performed, the target device 100 may be executing code that has both been verified as unaltered from its original form, and is cryptographically "bound" to the target device 100 on which it is executing. This method of ensuring secure mode execution of a target device may be contrasted with other systems, where a processor enters secure mode upon hardware reset and then may execute in a hypervisor mode or the like in order to establish a root-of-trust.

Accordingly, using embodiments as disclosed, any or all of these data such as the compound key from the licensing authority, the message digest, the candidate code block, etc. (e.g., DS1, MD1, CC1) may be completely public as long as the secret key for the target device 100 (e.g., SK1) is not exposed. Thus, it is desired that the value of a target device's secret key is never exposed, either directly or indirectly. Accordingly, as discussed above, embodiments of the systems and methods presented herein, may, in addition to protecting the secret key from direct exposure, protect against indirect exposure of the secret key on target devices 100 by securing the working sets of processes executing in secure mode on target devices 100.

Figure 2:
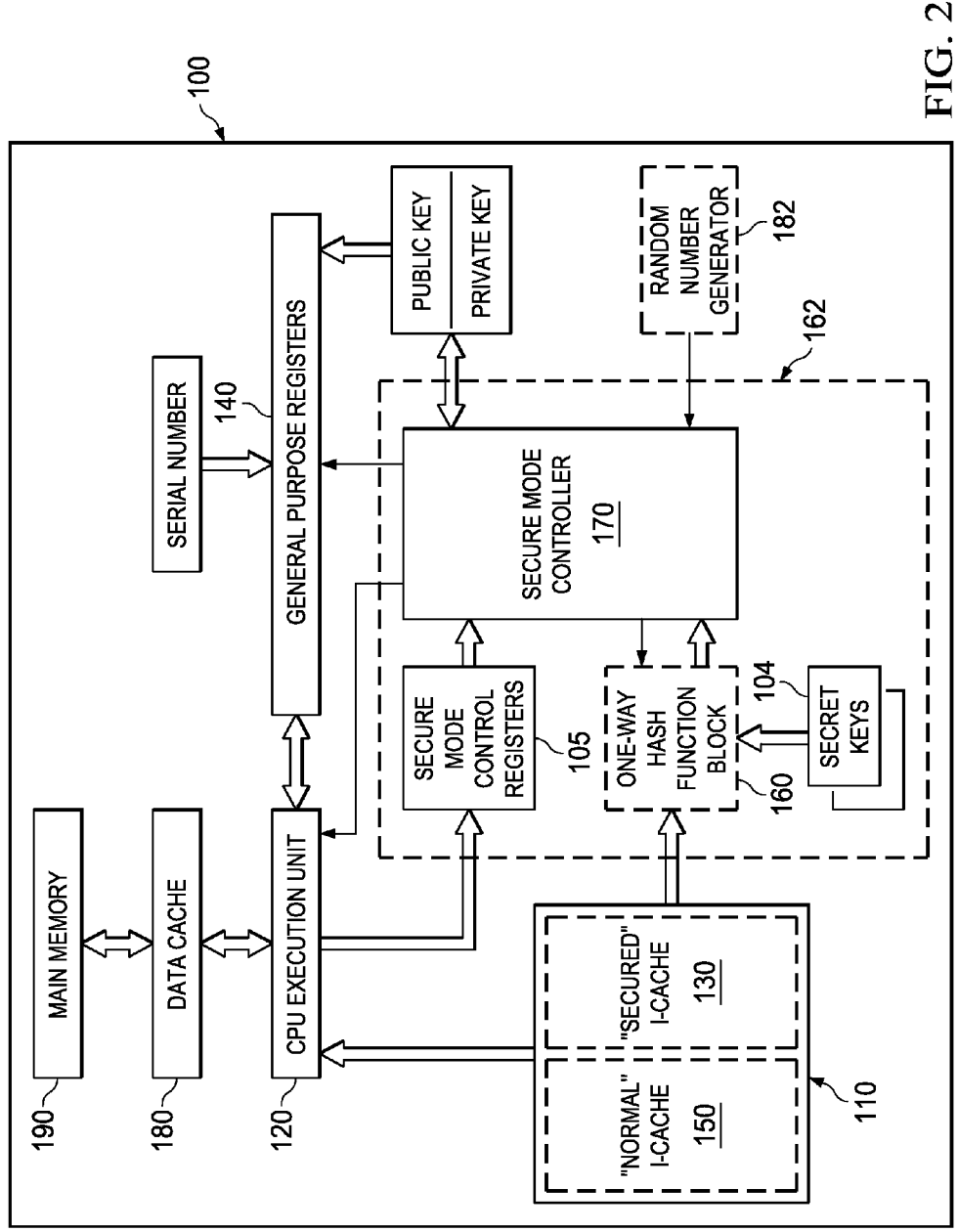
FIG. 2 depicts one embodiment of a target device.

FIG. 2 shows the architecture of one embodiment of a target device that is capable of controlling the execution of the digital content or implementing security protocols in conjunction with received digital content. Elements of the target unit may include a set of blocks, which allow a process to execute in a secured mode on the target device such that when a process is executing in secured mode the working set of the process may be isolated. It will be noted that while these blocks are described as hardware in this embodiment, software may be utilized to accomplish similar functionality with equal efficacy. It will also be noted that while certain embodiments may include all the blocks described herein other embodiments may utilize lesser or additional blocks.

The target device 100 may comprise a CPU execution unit 120 which may be a processor core with an execution unit and instruction pipeline. Target unit 100 may also contain a true random number generator 182 which may be configured to produce a sequence of sufficiently random numbers or which can then be used to supply seed values for a pseudo-random number generation system. This pseudo-random number generator can also potentially be implemented in hardware, software or in "secure" software.

One-way hash function block 160 may be operable for implementing a hashing function substantially in hardware. One-way hash function block 160 may be a part of a secure execution controller 162 that may be used to control the placement of the target device 100 in secure mode or that may be used to control memory accesses (e.g., when the target device 100 is executing in secured mode), as will be described in more detail herein at a later point.

In one embodiment, one way hash function block 160 may be implemented in a virtual fashion, by a secure process running on the same CPU that is used to evaluate whether a given process is secure or not. In certain embodiments two conditions may be adhered to, ensuring that such a system may resolve correctly. First, the secure mode "evaluation" operation (e.g., the hash function) proceeds independently of the execution of the secure process that it is evaluating. Second, a chain of nested evaluations may have a definitive termination point (which may be referred to as the root of the "chain of trust" or simply the "root of trust"). In such embodiments, this "root of trust" may be the minimum portion of the system that should be implemented in some non-changeable fashion (e.g., in hardware). This minimum feature may be referred to as a "hardware root of trust". For example, in such embodiments, one such hardware root of trust might be a One-Way hash function that is realized in firmware (e.g., in non-changeable software).

Another portion of the target unit 100 may be a hardware-assisted secure mode controller block 170. This secure mode controller block 170 can be implemented in a number of ways. In one example, the secure mode controller block 170 is a general purpose processor or a state machine. The secure execution controller 162 also includes secure mode control registers 105, which define the configuration of the current security state on a process by process basis. As shown in FIG. 2, the secret key 104 and another number (for example, in initialization vector or nonce) are run through the one-way hash function block 160. The result of the hash function is repeatable and is a derivative of the secret. The result of the hash function is provided to the secure mode controller block 170.

It is not material to embodiments exactly which encryption algorithm is used for this hardware block 170. In order to promote the maximum flexibility, it is assumed that the actual hardware is general-purpose enough to be used in a non-algorithmically specific manner, but there are many different means by which this mechanism can be implemented. It should be noted at this point that the terms encryption and decryption will be utilized interchangeably herein when referring to engines (algorithms, hardware, software, etc.) for performing encryption/decryption. As will be realized if symmetric encryption is used in certain embodiments, the same or similar encryption or decryption engine may be utilized for both encryption and decryption. In the case of an asymmetric mechanism, the encryption and decryption functions may or may not be substantially similar, even though the keys may be different.

Target device 100 may also comprise a data cache 180, the instruction cache 110 where code that is to be executed can be stored, and main memory 190. Data cache 180 may be almost any type of cache desired such as a L1 or L2 cache. In one embodiment, data cache 180 may be configured to associate a secure process descriptor with one or more pages of the cache and may have one or more security flags associated with (all or some subset of the) lines of a data cache 180. For example, a secure process descriptor may be associated with a page of data cache 180.

Generally, embodiments of target device 100 may isolate the working set of a process executing in secure mode stored in data cache 180 such that the data is inaccessible to any other process, even after the original process terminates. More specifically, in one embodiment, the entire working set of a currently executing may be stored in data cache 180 and writes to main memory 190 and write-through of that cache (e.g., to main memory 190) disallowed (e.g., by secured execution controller 162) when executing in secured mode.

Additionally, for any of those lines of data cache 180 that are written to while executing in secure mode (e.g., a "dirty" cache line) those cache lines (or the page that comprises those cache lines) may be associated with a secure process descriptor for the currently executing process. The secure process descriptor may uniquely specify those associated "dirty" cache lines as belonging to the executing secure process, such that access to those cache lines can be restricted to only that process (e.g., be by secured execution controller 162).

In certain embodiments, in the event that the working set for a secure process overflows data cache 180 and portions of data cache 180 that include those dirty lines associated with the security descriptor of the currently executing process need to be written to main memory (e.g., a page swap or page out operation) external data transactions between the processor and the bus (e.g., an external memory bus) may be encrypted (e.g., using block 170 or encryption software executing in secure mode). The encryption (and decryption) of data written to main memory may be controlled by secure execution controller 162.

The key for such an encryption may be the secure process descriptor itself or some derivative thereof and that secure descriptor may itself be encrypted (e.g., using the target device's 100 secret key 104 or some derivative thereof) and stored in the main memory 190 in encrypted form as a part of the data being written to main memory.

Instruction cache 110 is typically known as an I-Cache. In some embodiments, a characteristic of portions of this I-Cache 110 is that the data contained within certain blocks be readable only by CPU execution unit 120. In other words, this particular block of I-Cache 130 is execute-only and may not be read from, nor written to, by any executing software. This block of I-Cache 130 will also be referred to as the "secured I-Cache" 130 herein. The manner by which code to be executed is stored in this secured I-Cache block 130 may be by way of another block which may or may not be depicted. Normal I-Cache 150 may be utilized to store code that is to be executed normally as is known in the art.

Additionally, in some embodiments, certain blocks may be used to accelerate the operation of a secure code block. Accordingly, a set of CPU registers 140 may be designated to only be accessible while the CPU 120 is executing secure code or which are cleared upon completion of execution of the secure code block (instructions in the secured I-cache block 130 executing in secured mode), or if, for some reason a jump to any section of code which is located in the non-secure or "normal" I-Cache 150 or other area occurs during the execution of code stored in the secured I-Cache 130.

In one embodiment, CPU execution unit 120 may be configured to track which registers 140 are read from or written to while executing the code stored in secured I-cache block 130 and then automatically clear or disable access to these registers upon exiting the "secured execution" mode. This allows the secured code to quickly "clean-up" after itself such that only data that is permitted to be shared between two kinds of code blocks is kept intact. Another possibility is that an author of code to be executed in the secured code block 130 can explicitly identify which registers 140 are to be cleared or disabled. In the case where a secure code block is interrupted and then resumed, then these disabled registers may potentially be re-enabled if it can be determined that the secure code that is being resumed has not been tampered with during the time that it was suspended.

In one embodiment, to deal with the "leaking" of data stored in registers 140 between secure and non-secure code segments a set of registers 140 which are to be used only when the CPU 120 is executing secured code may be identified. In one embodiment, this may be accomplished utilizing a version of the register renaming and scoreboarding mechanism, which is practiced in many contemporary CPU designs. In some embodiments, the execution of a code block in secured mode is treated as an atomic action (e.g., it is non-interruptible) which may make this such renaming and scoreboarding easier to implement.

Even though there may seem to be little possibility of the CPU 120 executing a mixture of "secured" code block (code from the secured I-Cache 130) and "unsecured code" (code in another location such as normal I-cache 150 or another location in memory), such a situation may arise in the process of switching contexts such as when jumping into interrupt routines, or depending on where the CPU 120 context is stored (most CPU's store the context in main memory, where it is potentially subject to discovery and manipulation by an unsecured code block).

In order to help protect against this eventuality, in one embodiment, another method which may be utilized for protecting the results obtained during the execution of a secured code block that is interrupted mid-execution from being exposed to other execution threads within a system is to disable stack pushes while a the target device 100 is operating in secured execution mode. This disabling of stack pushes will mean that a secured code block is thus not interruptible in the sense that, if the secured code block is interrupted prior to its normal completion, it cannot be resumed and therefore must be restarted from the beginning. It should be noted that in certain embodiments if the "secured execution" mode is disabled during a processor interrupt, then the secured code block may also potentially not be able to be restarted unless the entire calling chain is restarted.

Each target unit 100 may also have one or more secret key constants 104; the values of neither of which are software-readable. In one embodiment, the first of these keys (the primary secret key) may be organized as a set of secret keys, of which only one is readable at any particular time. If the "ownership" of a unit is changed (for example, the equipment containing the protocol engine is sold or its ownership is otherwise transferred), then the currently active primary secret key may be "cleared" or overwritten by a different value. This value can either be transferred to the unit in a secure manner or it can be already stored in the unit in such a manner that it is only used when this first key is cleared. In effect, this is equivalent to issuing a new primary secret key to that particular unit when its ownership is changed or if there is some other reason for such a change (such as a compromised key). A secondary secret key may be utilized with the target unit 100 itself. Since the CPU 120 of the target unit 100 cannot ever access the values of either the primary or the secondary secret keys, in some sense, the target unit 100 does not even "know" its own secret keys 104. These keys are only stored and used within the security execution controller 162 of the target unit 100 as will be described.

In another embodiment, the two keys may be constructed as a list of "paired" keys, where one such key is implemented as a one-time-programmable register and the other key in the pair is implemented using a rewriteable register. In this embodiment, the rewriteable register may be initialized to a known value (e.g., zero) and the only option that may be available for the system to execute in secure mode in that state may be to write a value into the rewriteable portion of the register. Once the value in this rewriteable register is initialized with some value (e.g., one that may only be known by the Licensing Authority, for example), then the system may only then be able to execute more general purpose code while in secure mode. If this rewriteable value should be reinitialized for some reason, then the use of a new value each time this register is written may provide increased security in the face of potential replay attacks.

Yet another set of keys may operate as part of a temporary public/private key system (also known as an asymmetric key system or a PKI system). The keys in this pair may be generated on the fly and may be used for establishing a secure communications link between similar units, without the intervention of a central server. As the security of such a system is typically lower than that of an equivalent key length symmetric key encryption system, these keys may be larger in size than those of the set of secret keys mentioned above. These keys may be used in conjunction with the value that is present in the on-chip timer block in order to guard against "replay attacks", among other things. Since these keys may be generated on the fly, the manner by which they are generated may be dependent on the random number generation system 182 in order to increase the overall system security.

In one embodiment, one method that can be used to affect a change in "ownership" of a particular target unit is to always use the primary secret key as a compound key in conjunction with another key 107, which we will refer to as a timestamp or timestamp value, as the value of this key may be changed (in other words may have different values at different times), and may not necessarily reflect the current time of day. This timestamp value itself may or may not be itself architecturally visible (e.g., it may not necessarily be a secret key), but nonetheless it will not be able to be modified unless the target unit 100 is operating in secured execution mode. In such a case, the consistent use of the timestamp value as a component of a compound key whenever the primary secret is used can produce essentially the same effect as if the primary secret key had been switched to a separate value, thus effectively allowing a "change of ownership" of a particular target endpoint unit without having to modify the primary secret key itself.

As may be understood then, the target device 100 may use secure execution controller 162 and data cache 180 to isolate the working sets of processes executing in secure mode such that the data is inaccessible to any other process, even after the original process terminates. This working set isolation may be accomplished in certain embodiments by disabling off-chip writes and write-through of data cache when executing in secured mode, associating lines of the data cache written by the executing process with a secure descriptor (that may be uniquely associated with the executing process) and restricting access to those cache lines to only that process using the secure process descriptor. Such a secure process descriptor may be a compound key such as an authorization code or some derivative value thereof.

When it is desired to access data in the data cache by the process the secure descriptor associated with the currently executing process may be compared with the secure descriptor associated with the requested line of the data cache. If the secure descriptors match, the data of that cache line may be provided to the executing process while if the secure descriptors do not match the data may not be provide and another action may be taken.

Moreover, in certain embodiments, in the event that the working set for a secure process overflows the on-chip cache, and portions of cache that include those dirty lines associated with the secure process descriptor need to be written to main memory (e.g., a page swap or page out operation) external data transactions between the processor and the bus (e.g., an external memory bus) may be encrypted. The key for such an encryption may be the secure process descriptor itself or some derivative thereof and that secure process descriptor may be encrypted (e.g., using the target device's secret key or some derivative thereof) prior to being written out to the main memory. Again, this encryption processes may be accomplished substantially using the hashing block of the target device or by use of an software encryption process running in secure mode on the processor itself or some other on-chip processing resource, or by use of a encryption function that is implemented in hardware.

To enhance performance, in certain cases where a secure process may have a large working set or is frequently interrupted (e.g., entailing many page swaps) a subset of the processes working set that is considered "secure" may be created (e.g., only a subset of the dirty cache lines for the process may be associated with the secure descriptor) and only encrypt those cache lines or the portion of the cache containing those lines, when it is written out to external memory.

Additionally, to enhance performance, an off-chip storage mechanism (e.g., a page swapping module) can be run asynchronously in parallel with an interrupting process (e.g., using a DMA unit with integrated AES encryption hardware acceleration) and thus, could be designed to have a minimal impact on the main processor performance. In another embodiment, a separate secure "working set encapsulation" software module may be used to perform the encryption prior to allowing working set data to be written out to memory.

Figure 3:
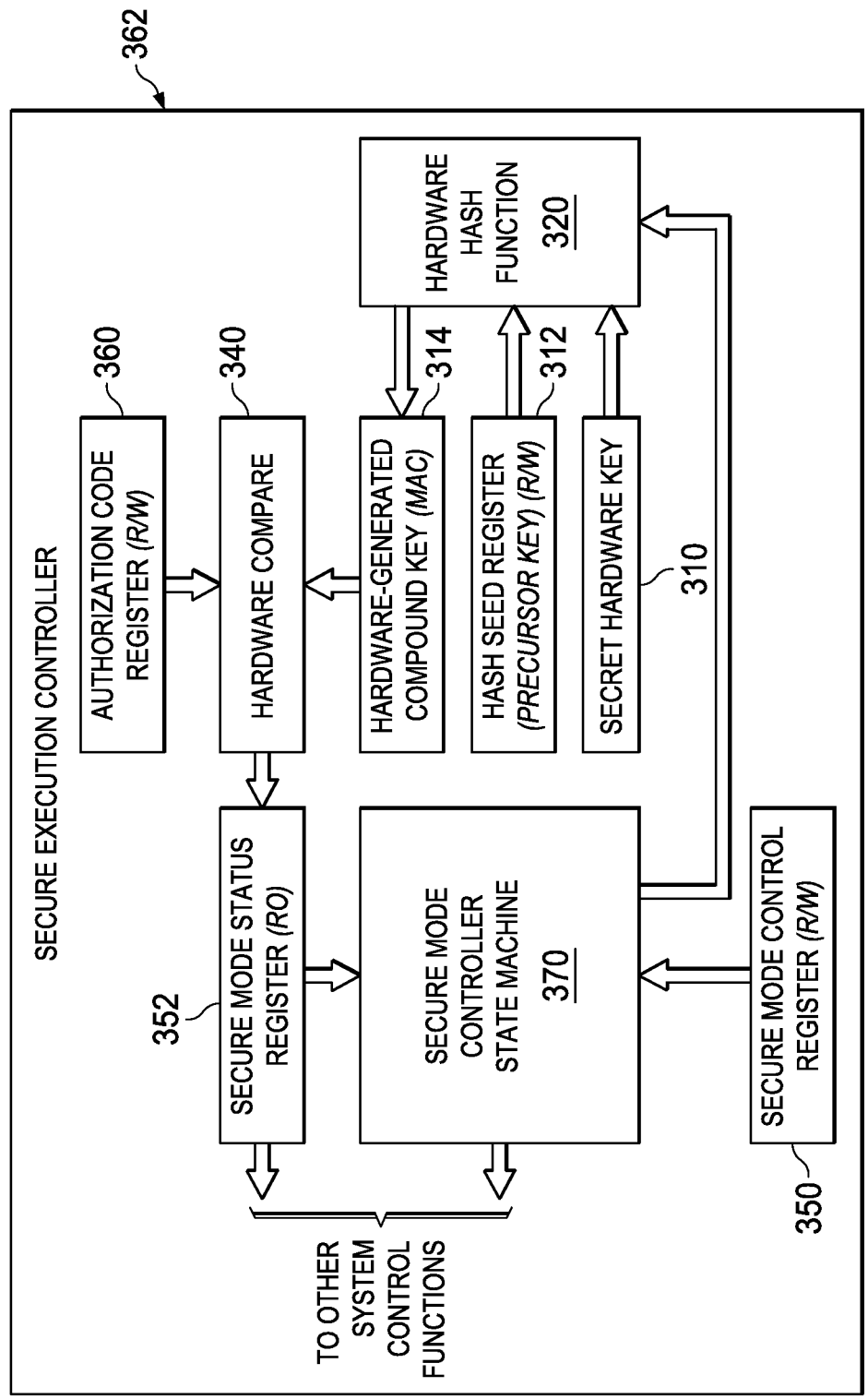
FIG. 3 depicts one embodiment of a secure execution controller.

Referring to FIG. 3, one embodiment of the architecture of a secure execution controller is depicted. In this embodiment, secure execution controller 362 is associated with a CPU of a system in which it is included and is intended to support the running of a candidate code block in secure mode on the main CPU. As such, secure execution controller 362 may comprise one or more of registers, including a secret hardware key 310 which is not visible to the CPU, secure mode control register 350, authorization code register 360, secure mode status register 352, hash seed register 312 and hardware generated compound key register 314. Of these registers, all but secret hardware key 310 may be readable by a CPU without affecting the overall security of the system, although any of these other registers may or may not be visible.

Secure mode control register 350 may be a register that may be written to in order to attempt to place the target device in a secure mode. The secure mode control register 350 may have a register into which a memory location (e.g., in an I-cache or main memory) corresponding to the beginning address of a candidate code block (e.g., a code block to be executed in secured mode) may be written and a separate register into which the length of such a candidate code block may be written. Authorization code register 360 may be a location into which an authorization code or another type of key or data may be written. Secure mode status register 352 may be a memory-mapped location comprising one or more bits that may only be set by hardware comparison block 340 and which can indicate whether or not the target device 100 is operating in secure mode.

Hardware hash function block 320 may be operable for implementing a hash function substantially in hardware to generate a compound key 314. Hardware hash function block 320 may, for example, implement a SHA 256 or some similar one-way hash function. However, this hash function may also be implemented in software or in firmware running on either a separate processor from the CPU of the system, or even a process that is run on the CPU in secure mode, using a virtual hardware hash function methodology as described earlier.

Hardware hash function block 320 may take as input one or more of the values stored in the hash seed register 312, secret hardware key 310 or data from another location, concatenate these inputs (e.g., prepend or append one input to another) and hash the resulting data set to generate a message authentication code, which we have referred to earlier as a one-way compound key.

In certain embodiments, almost any numeric value can be provided as an input (precursor) for hardware hash function block 320. For example, the input data for the hardware hash function may be constructed by a concatenation of the secret hardware key, a hash seed precursor key and a secure code block candidate. There may be no fundamental difference in the operation of the hash function, almost no matter what the input data represent or how large any of these data sets may be. It should also be noted that there may be other inputs to the hardware hash function coming from a secure mode controller state machine that function as control inputs as opposed to input data to the hash function.

Hardware generated compound key register 314 is configured to store the output of the hardware hash function block 320. Hardware comparison block 340 may be configured to compare the data in hardware generated compound key register 314 with the data in authorization code register 360. If the two values are identical the hardware comparison block 340 is configured to set the one or more bits in secure mode status register 352 that place the target device in secure mode.

Secure mode controller state machine 370 may be logic (e.g., hardware, software or some combination) that may operate based on the state of bits of secure mode control register 350 or secure mode status register 352. Secure mode controller state machine 370 is configured for controlling inputs to hardware hash function block 320, such that the precursors may be utilized in the correct manner to generate the desired output 314 of hardware hash function block 320. For example, secure mode controller state machine 370 may be configured to cause the resulting output to be loaded into hardware generated compound key register 314 at the proper time. Additionally, secure mode controller state machine 370 may be configured to cause the correct data to be written to secure mode status register 352.

Secure mode controller state machine 370 may also be configured for controlling memory access when the target device is executing in secure mode. In one embodiment, when the bits in secure mode status register 352 that indicate that the target device is now operating in secure mode, then secure mode controller state machine 370 may be configured to determine which of the pages of the data cache have been assigned to that process and store a secure descriptor for that process in the data cache in association with the one or more of the pages of the data cache. These secure process descriptors may thus be used to associate a particular set of data that is being stored in the data cache with a specific process that is executing in secured mode. Such a secure process descriptor may, for example, be the value that is based on the data that is located in authorization code register 360 or the hardware-generated compound key register 314.

Additionally, when the bits in secure mode status register 352 that place the target device in secure mode are set, secure mode controller state machine 370 may be able to receive memory accesses by the process executing in secure mode and determine if the memory access is a read or a write access.

If the data access consists of a write operation, the secured mode controller state machine 370 may be configured to determine the cache line of the data cache corresponding to the address where the data is to be written and then set a security flag associated with that cache line to indicate that the data contained in that cache line is secure. In certain embodiments, secured mode controller state machine 370 is also configured to prevent any writes to any memory location which is not in the data cache, for example by disabling write-through, write-back or other operations of the data cache or memory controllers of the target device.

If the access is a read access the secured mode controller state machine 370 may be configured to determine if a cache miss has occurred and if the requested address was not previously stored in the data cache the secured mode controller state machine 370 may be configured to allow the requested data to be read from main memory and placed in the data cache in a page associated with the process. If a cache hit occurs the secured mode controller state machine 370 may be configured to the determine the cache line corresponding to the address of the memory access and check the security flag associated with that cache line to determine if it is set. If the security flag is not set the memory access may be allowed to proceed (e.g., the data read from the cache line).

Alternatively, if a security flag associated with the cache line in the data cache corresponding to the address from which data is to be read is set secured mode controller state machine 370 may be configured to obtain the secure process descriptor associated with the page in the data cache containing that cache line and compare it with a secure process descriptor associated with the currently executing. If the secure process descriptors match, then the memory access may be allowed to proceed. If the secure descriptors do not match, another action may be taken such as either returning a garbage or preset value in response to the memory access or alternately returning a "no-valid data" at that address message to the CPU, whereupon the CPU memory management unit may then request a replacement cache line to read in from system memory.

In one embodiment, only the data cache is used to store the entire working set of a process executing in secure mode and any writes to memory other than to the data cache by the process may be disabled. Additionally, any lines of the data cache that are written to (e.g., so-called "dirty" cache lines) while in secure mode are associated with a secure process descriptor that may uniquely and precisely specify which process to whom the "dirty" cache line belongs. Access to these cache lines may only be allowed to the owner of the particular "dirty" cache line such that any cache line modified during the operation of a secure process is unreadable by any other process, even after the original process has terminated. Thus, data that belongs to one instance of a process is unambiguously isolated from any other process.

Figure 4A:
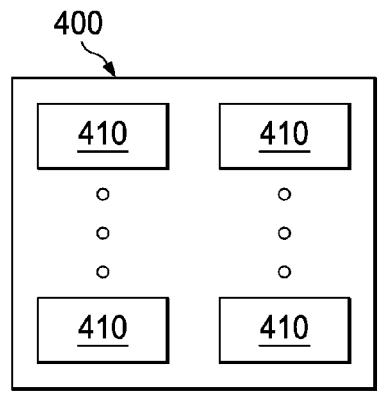
FIGS. 4A and 4B depict an embodiment of a cache architecture used for process working set isolation.
Figure 4B:
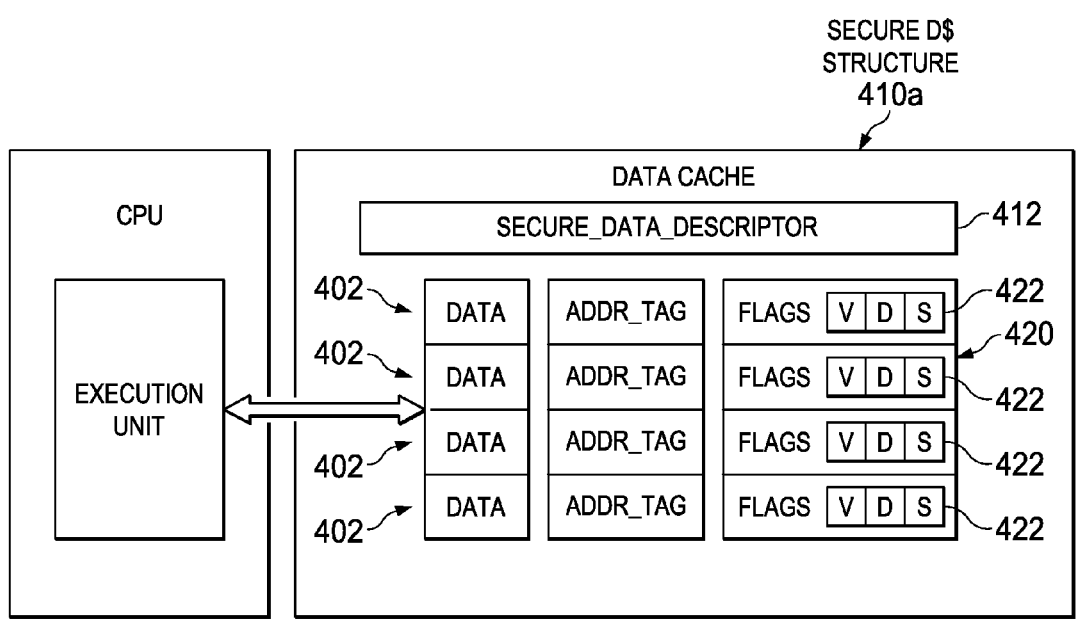

It may also be helpful to give a general overview of an exemplary data cache architecture. FIGS. 4A and 4B illustrate one embodiment of the architecture of a data cache that may be utilized to effectuate isolation of working sets of processes according to certain embodiments. Referring first to FIG. 4A, data cache 400 may be almost any type of cache, including a L1 cache a L2 cache, a direct mapped cache, a 2-way set associative cache, a 4-way set associative, a 2-way skewed associative cache, etc. that may be implemented in conjunction with almost any management or write policies desired. The cache 400 may comprise a set of pages 410. When used when referring to the cache herein, a page may be understood to mean cache block or a cache set. The data cache 400 is configured to store a secure descriptor associated with one or more pages 410 of the cache.

FIG. 4B depicts a view of one embodiment of a page 410a of cache 400. Here, the cache comprises logic 412 designed to store a secure process descriptor in association with the page 410a and to provide the secure process descriptor in response to a request for the secure process descriptor for page 410a or in conjunction with a read to a cache line 402 of page 410a. Each cache line 402 of the page 410a includes bits for the data, address tags and flags 420. The flags 420 may include bits such as a valid bit or dirty bit. In addition, flags 420 may include a secure bit 422. Cache 400 may be configured such that a secure bit 422 for a cache line 402 may be set (e.g., when a process executing in secure mode writes to that cache line 402).

It will now be useful to explain how embodiments of such a target device may be place in secured mode. It should be noted that, in one embodiment, the procedure by which any generic (or otherwise) block of code (which will be referred to as a "secure work function") may be executed in secure mode on embodiments of a system such as those described herein is to execute a pair of extra functions, one on either side (e.g., before or after) of the secure work function. A function (or set of functions) that is executed immediately prior to a secure work function will be referred to as the "prologue" and a function (or set of functions) which is executed immediately after the secure work function will be referred to as the "epilogue".

Thus, in one embodiment, in order to execute a secure work function on a CPU, then that secure work function should be preceded by a prologue and followed by an epilogue. In certain embodiments, the purpose of the prologue is at least threefold. First, the prologue should prepare the input arguments that are passed to the secure work function for use by the secure work function. This preparation may involve, for example, a decryption process, which may be required for those input arguments that may not be passed to the secure work function in the clear. A second function of the prologue may be to construct a compound key whose value is dependent on a number of data elements. Such data elements may include the hardware secret key of the target device, the Authorization Code of the parent (e.g., calling) function, a list of one or more input arguments to the secure work function (either in encrypted or non-encrypted form), the executable image of the secure work function itself, or some other information that may be used in determining whether or not the secure work function should be allowed to execute on the target device in secure mode.

A third function of the prologue could be to initiate a request that the CPU begin executing the secure work function in secure mode.

The purpose of the epilogue may be to "clean up" after the execution of the secure work function is complete. One function the epilogue may be to prepare any designated output parameters for use by subsequent code blocks (e.g., to be executed after the secure work function), be they secure or not. For example, this preparation may involve encrypting of the designated output (or returned data) from the secure work function so that any observing process other than the intended recipient of such output arguments, including either hardware or software-based observers, may be precluded from effectively intercepting that data. In such a case, the encryption key that may be used may be a reversible compound key that is passed to the secure routine as one of its calling arguments.

A second function of the epilogue may be to either programmatically or automatically invalidate those portions of a data cache that have been written to while the secure work function (e.g., by the secure work function) was executing. Thus, in the case where a secure work function may have had its operation suspended and then resumed, the data values that were written to a secure portion of the data cache prior to the process being suspended may thus be available to the resumed secure process without having to page these secure data locations out to memory (which may involve an intervening encryption process). Then, once the secure function had been resumed, these same data cache locations may then be made available to the secure function, since the secure process descriptor may match the currently executing authorization code, or some derivative thereof (or another value being used as a secure process descriptor).

However, once a secure process had terminated (for example, using an epilogue function), then these same secure data cache locations may be marked as invalid during the epilogue function. This invalidation process would prevent any unintended potential "leakage" of data that may still be resident in the secure portion of the data cache from being accessed after the secure work function has terminated properly.

In this manner, even if a secure work function is repeated and if it is given the same secure process descriptor twice in a row, the second iteration of this secure work function will nonetheless be unable to access the working set data from the first iteration of that same secure work function, despite the fact that they might have the same secure process descriptor for both iterations. It will be noted that the descriptions of the prologue and epilogue are provided by way of example and that more or fewer functions may be accomplished by the prologue of the epilogue and that additionally, these function (or additional or fewer function) may be accomplished in another manner without departing from the scope of embodiments as described.

Figure 5:
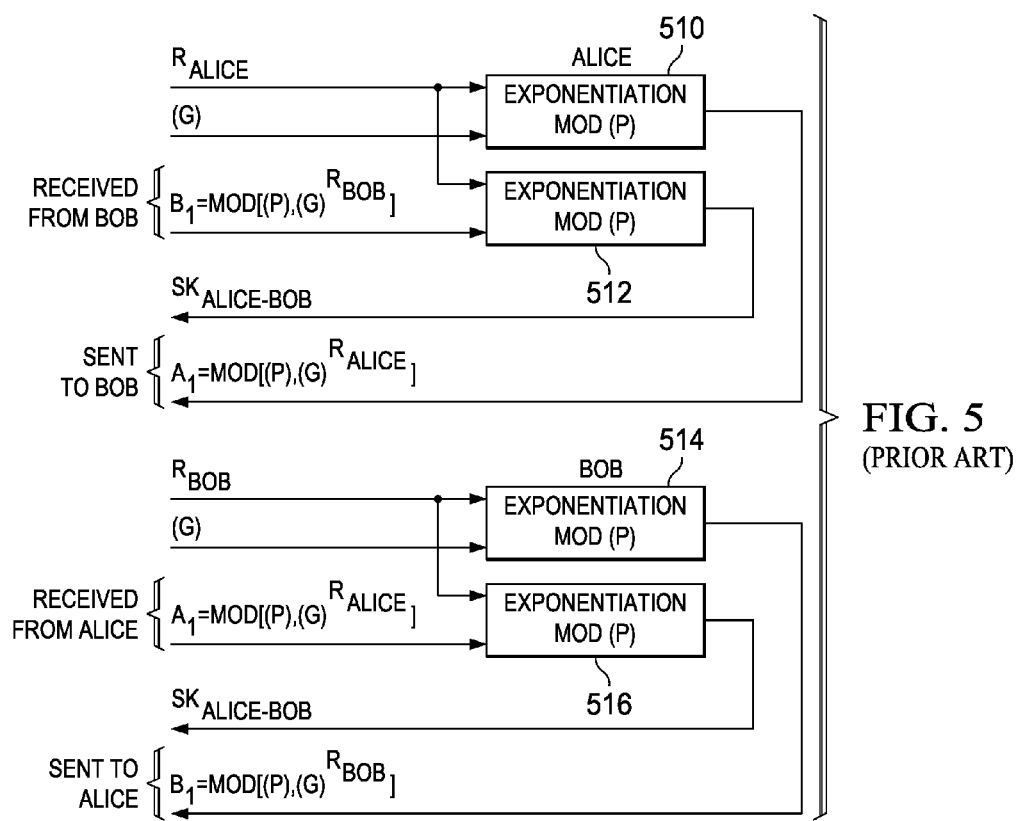
FIG. 5 depicts an example of a Diffie Hellman based authentication and key exchange (AKE)

Referring back to the discussion above with respect to secure methods for authentication and key exchange, as a background, following is one example of such a method. FIG. 5 is a diagram illustrating one method for key exchange, known as "Diffie-Hellman" key exchange.

As shown in FIG. 5, each user (Alice, Bob) employs exponentiation functions (blocks 510, 512, 514, and 516) to generate a shared session key $SK_{ALICE-BOB}$. In the example of FIG. 5, Alice and Bob have to agree on several pieces of information ahead of time, including a prime number P and a base G, which is a modulo. Alice and Bob each choose a random number ($R_{ALICE}$, $R_{BOB}$). As illustrated in FIG. 5, exponentiation function block 510 inputs $R_{ALICE}$ and G, and generates A1, which is sent to Bob. Exponentiation function block 512 inputs $R_{ALICE}$ and B1 (received from Bob), and generates the shared session key $SK_{ALICE-BOB}$. Bob generates $SK_{ALICE-BOB}$ in the same manner. As illustrated by the formulas in FIG. 5, A1 is a derivative of Alice's random number $R_{ALICE}$, and B1 is a derivative of Bob's random number $R_{BOB}$.

By generating the session key ($SK_{ALICE-BOB}$) in this fashion, Diffie-Hellman offers the advantage of perfect forward secrecy. That is, the compromise of one message cannot lead to the compromise of others. In addition, there is not a single secret value which can lead to the compromise of multiple messages, as in RSA. However, a Diffie-Hellman key exchange can be vulnerable to man-in-the-middle attacks, in which an attacker makes independent connections with each party and relays messages between them, making them believe that they are talking directly to each other over a private connection, when in fact the entire conversation is controlled by the attacker. In addition, Diffie-Hellman key exchange exposes both the session key ($SK_{ALICE-BOB}$) and the exponents ($R_{ALICE}$, $R_{BOB}$) in memory. Additional details of the Diffie-Hellman key exchange may be obtained from Hellman, et al., U.S. Pat. No. 4,200,770, which is incorporated by reference in its entirety herein.

Figure 6:
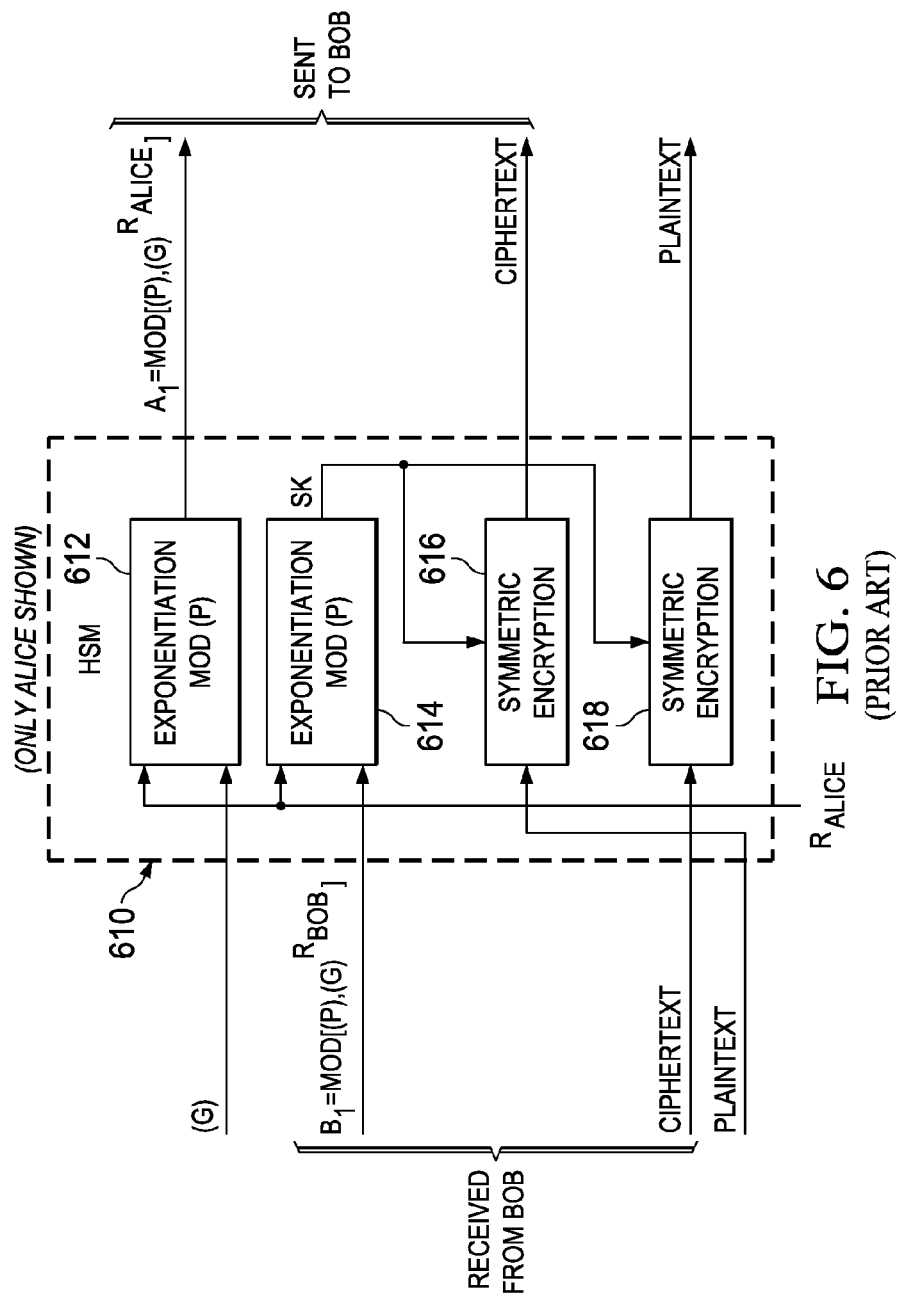
FIG. 6 depicts an example of a Diffie Hellman based AKE using a hardware security module.

FIG. 6 illustrates an example implementation of Diffie-Hellman which cures the problem of the exposure of the exponents and session key through use of a hardware security module (HSM). A typical HSM is comprised of physical computing device that safeguards and manages digital keys for strong authentication and provides crypto-processing. In some examples, an HSM comes in the form of a plug-in card or an external device that attaches directly to a computer or network server. In an implementation such as that shown in FIG. 6, the processor makes use of an HSM secret key, but has no knowledge itself of its value.

FIG. 6 shows an HSM 610 (Alice's only), having various inputs (G, $R_{ALICE}$, B1 (received from Bob), Ciphertext (received from Bob), and Plaintext (text to be encrypted and sent to Bob)) and outputs (A1 (sent to Bob), Ciphertext (sent to Bob), and Plaintext (the decrypted ciphertext received from Bob)). The HSM 610 uses exponentiation function blocks 612 and 614, and symmetric encryption blocks 616 and 618 to generate session key (SK) and the outputs described above.

The HSM 610 may be implemented using a recursive security protocol. For example, such protocols include those described in U.S. Pat. No. 7,203,844, issued Apr. 10, 2007, entitled "Recursive Security Protocol System and Method for Digital Copyright Control," U.S. Pat. No. 7,457,968, issued Nov. 25, 2008, entitled "Method and System for a Recursive Security Protocol for Digital Copyright Control," U.S. Pat. No. 7,747,876, issued Jun. 29, 2010, entitled "Method and System for a Recursive Security Protocol for Digital Copyright Control," U.S. Pat. No. 8,438,392, issued May 7, 2013, entitled "Method and System for Control of Code Execution on a General Purpose Computing Device and Control of Code Execution in an Recursive Security Protocol," U.S. Pat. No. 8,726,035, issued May 13, 2014, entitled "Method and System for a Recursive Security Protocol for Digital Copyright Control," U.S. patent application Ser. No. 13/745,236, filed Jan. 18, 2013, entitled "Method and System for a Recursive Security Protocol for Digital Copyright Control," U.S. patent application Ser. No. 13/847,370, filed Mar. 19, 2013, entitled "Method and System for Process Working Set Isolation," and U.S. Provisional Patent Application No. 61/882,796, filed Sep. 26, 2013, entitled "Method and System for Establishing and Using a Distributed Key Server," which are hereby incorporated by reference in their entireties for all purposes. However, while the issue of exposure in memory is solved, the man-in-the-middle attack vulnerability remains.

Figure 7:
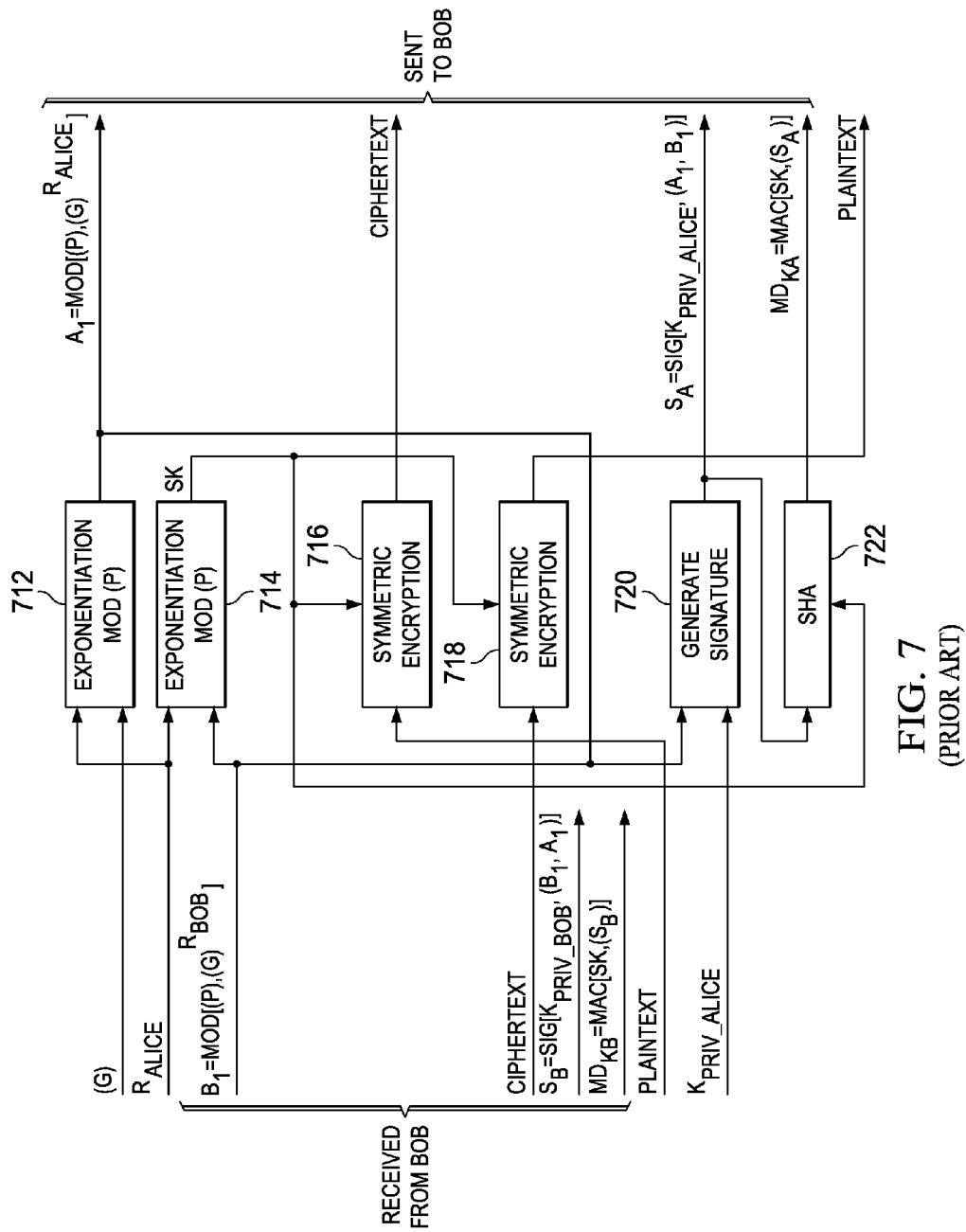
FIG. 7 depicts an example of a station-to-station message authentication code (STS-MAC) based AKE implemented in software.

FIG. 7 illustrates a software-only key exchange mechanism that combines Diffie-Hellman and RSA to overcome the disadvantages of each. The Diffie-Hellman component is illustrated in the upper portion of FIG. 7, and the RSA component is illustrated in the lower portion of FIG. 7. The implementation of the mechanism shown in FIG. 7 solves the man-in-the-middle attack problem of Diffie-Hellman as well as the perfect forward secrecy problem of RSA. However, it suffers the disadvantages of exposing Alice's private key, the exponent, and the session key in memory.

The Diffie-Hellman component of FIG. 7 (including exponentiation function blocks 712 and 714, and symmetric encryption blocks 716 and 718) functions in a manner similar to that described above with respect to FIG. 6. The RSA component of FIG. 7 includes signature generation block 720 and SHA block 722. The signature generation block 720 takes A1, B1, and $K_{PRIV\_ALICE}$ and generates signature $S_A$. SHA block 722 takes the session key (SK) and signature $S_A$ and generates a message digest of the session key ($MD_{KA}$).

Figure 8:
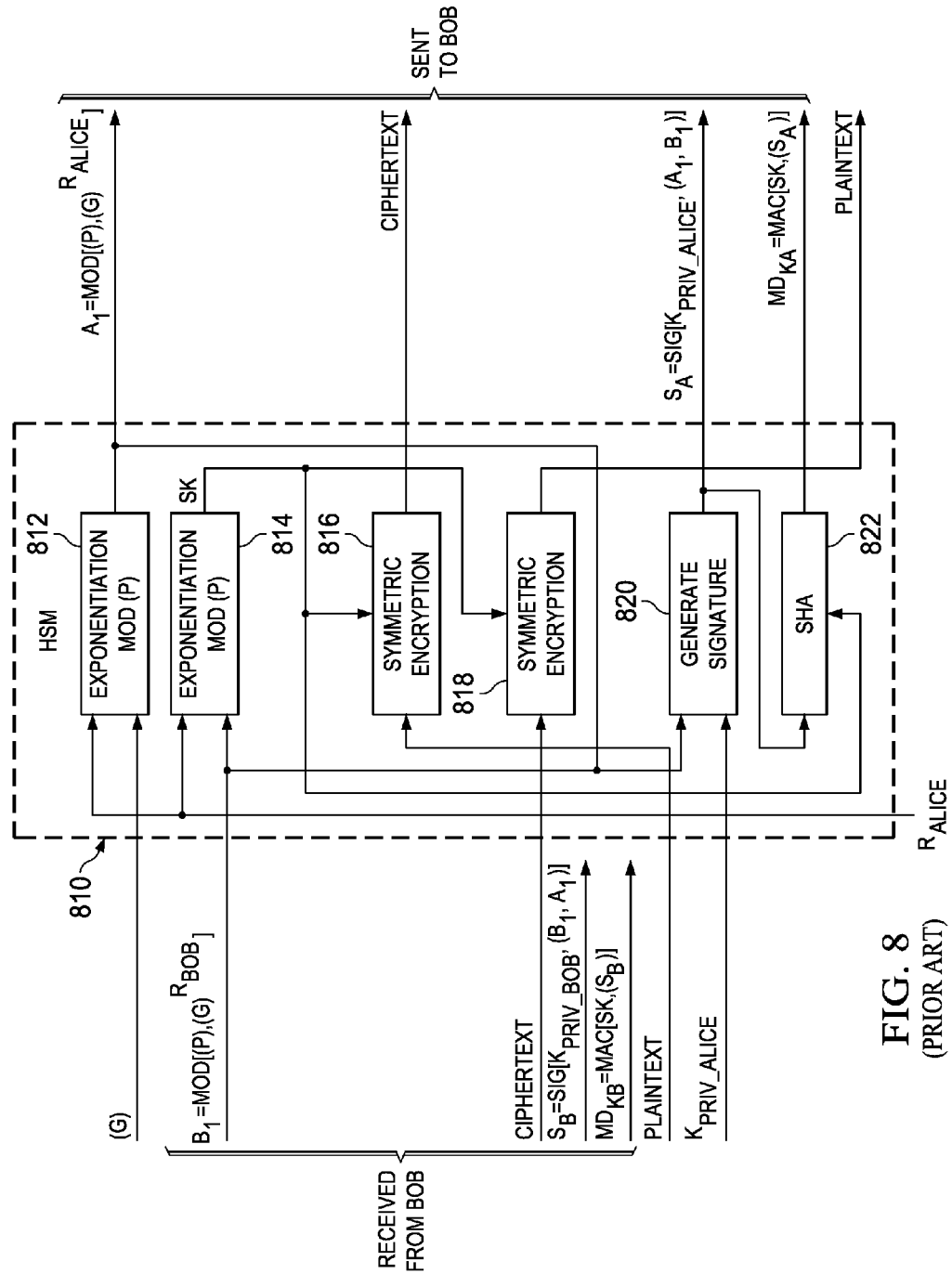
FIG. 8 depicts an example of a station-to-station message authentication code (STS-MAC) based AKE implemented partially using a hardware security module.

FIG. 8 illustrates a partial hardware security module solution that solves the issue of the exposure of the exponent and the session key. However, Alice's private key remains exposed in memory. Generally, FIG. 8 shows the Diffie-Hellman/RSA solution of FIG. 7 implemented in an HSM 810. Similar to FIG. 7, the HSM 810 includes exponentiation function blocks 812 and 814, symmetric encryption blocks 816 and 818, signature generation block 820, and SHA block 822.

As noted above, the implementations described with reference to FIGS. 7-8 solve the problems of a man-in-the-middle attack and those of perfect forward secrecy. However, such systems require a plurality of exponentiation modules, as well as asymmetric encryption, which are intensive in their use of CPU cycles and processing power. In systems requiring simple and fast implementation, processing time can be prohibitive. For example, the computation time can increase with the square of the number of user devices in the network.

Embodiments, however, offer improved performance time as well as solving the man-in-the-middle and perfect forward secrecy issues. Embodiments may be implemented in standalone versions or as backward compatible versions. In these latter implementations, performance of systems that employ combined Diffie-Hellman RSA systems is improved.

Figure 9:
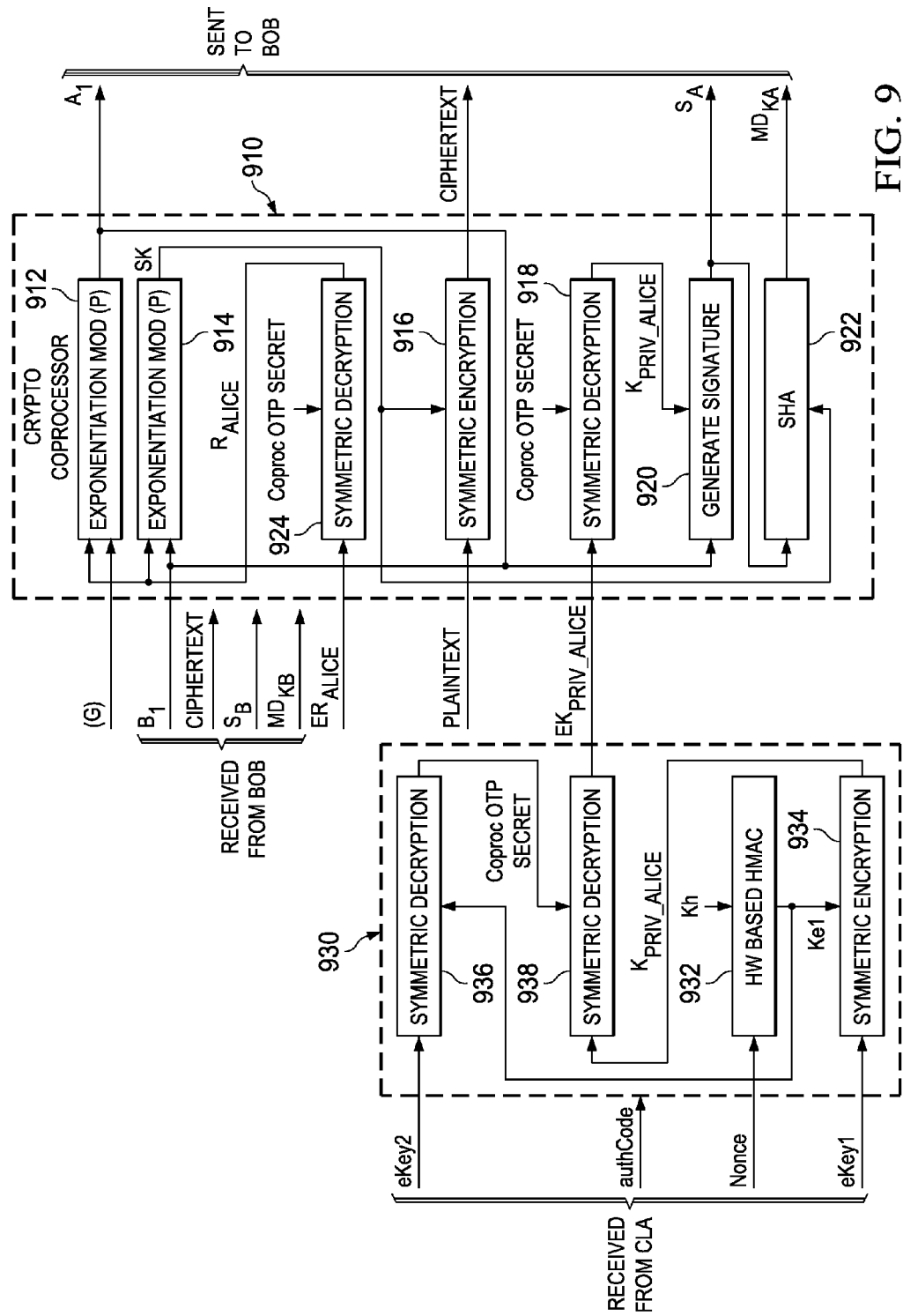
FIG. 9 depicts a secure AKE implemented using an HSM module and a crypto co-processor.

FIG. 9 offers a solution according to embodiments that that employs a combined Diffie-Hellman RSA system, similar to the embodiments shown in FIGS. 7 and 8. In the embodiment illustrated, a crypto co-processor 910 is provided to implement the Diffie-Hellman RSA processing. The embodiment shown in FIG. 9 also uses an HSM module 930. The HSM module 930 implements an ephemeral HSM that generates two operands securely: the OTP secret of the coprocessor and Alice's private key ($K_{PRIV\_ALICE}$). The HSM module 930 may be implemented using recursive security, such as described above. Once the encrypted private key ($EK_{PRIV\_ALICE}$) is generated and sent to the crypto coprocessor 910, performance is improved (on the order of 40%). Alice's encrypted private key ($EK_{PRIV\_ALICE}$) is generated using the private key ($K_{PRIV\_ALICE}$) and the OTP secret which are not externally accessible (described below). The HSM module 930 receives an authCode, a Nonce, an eKey1 (the encrypted version of Alice's private key) and an eKey2 (the encrypted version of the co-processor OTB secret) from a central license authority (CLA).

The crypto co-processor 910 can be implemented using an inexpensive processor, rather than an HSM. One example of a suitable crypto co-processor can be selected from the Freescale C29x family of crypto coprocessors. Similar to FIG. 8, the crypto co-processor 910 includes exponentiation function blocks 912 and 914, symmetric encryption blocks 916 and 918, signature generation block 920, and SHA block 922. In addition, symmetric encryption block 924 receives Alice's encrypted number ($ER_{ALICE}$) and the OTP secret to generate $R_{ALICE}$, which is provided to exponentiation function blocks 912 and 914. One difference between the embodiment shown in FIG. 8 is that the symmetric encryption block 918 generates Alice's private key ($K_{PRIV\_ALICE}$) by decrypting Alice's encrypted private key ($EK_{PRIV\_ALICE}$) using the OTP secret.

The HSM module 930 has a hardware based HMAC 932 that uses the Nonce received from the CLA and the HSM module secret key (Kh) to generate key (Ke1). Symmetric encryption block 934 uses Ke1 and eKey1 from the CLA to generate Alice's private key ($K_{PRIV\_ALICE}$). Symmetric decryption block 936 uses key Ke1 and eKey2 from the CLA to generate the co-processor OTP secret. Symmetric decryption block 938 uses the generated co-processor OTP secret and Alice's private key ($K_{PRIV\_ALICE}$) to generate Alice's encrypted private key ($EK_{PRIV\_ALICE}$), which is sent to the crypto co-processor 910. As with the other examples shown in FIGS. 6-8, only Alice's side is shown.

Figure 10:
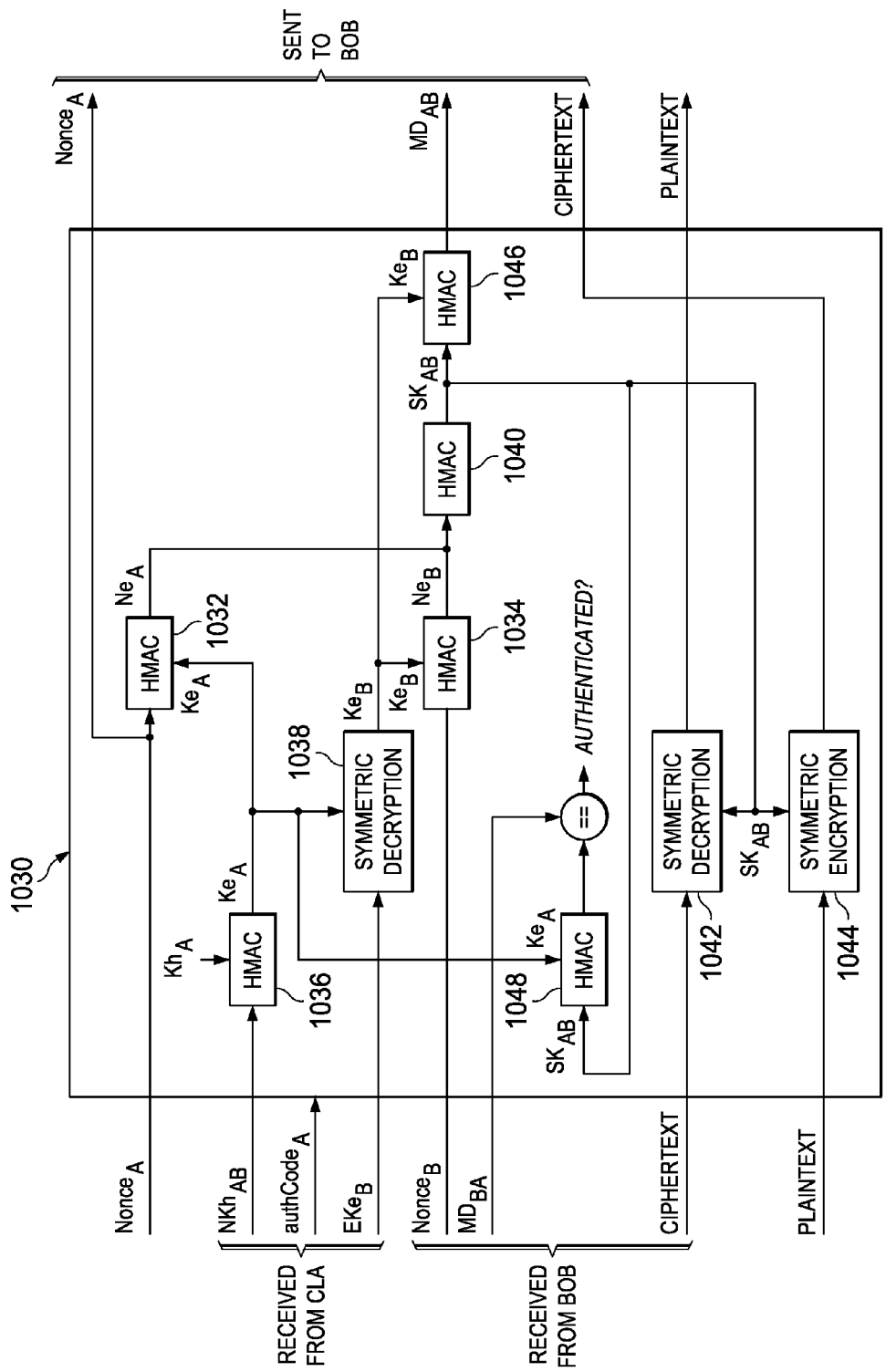
FIG. 10 depicts a 2-party secure AKE implemented without using asymmetric cryptography.

Additional embodiments provide a SHA based AKE. As shown in FIG. 10, embodiments allow users to securely identify parties with whom they are talking and also generate secure keys for encryption. FIG. 10 shows a hardware block secured, for example, by recursive security. As shown in FIG. 10, an HSM module 1030 for a party ("Alice") according to embodiments may receive a NonceB, message digest ($MD_{BA}$), and ciphertext from another party "Bob." In addition, Alice may receive, from a licensing authority, an authorization code (authCode$_A$), a nonce (NKh$_{AB}$) and an encryption key (EKe$_B$). Alice generates a Nonce$_A$ and also sends it to Bob. Alice's HSM module 1030 further generates a message digest ($MD_{AB}$) of the session key.

In operation, Alice sends Bob Nonce$_A$ and Bob sends Alice Nonce$_B$. Alice passes Nonce$_A$ and Nonce$_B$ through HMACs (Hash Message Authentication Code, e.g., SHA functions) 1032 and 1034, respectively, to generate message digests Ne$_A$ and Ne$_B$. These message digests are hashes of the nonces (Nonce$_A$ and Nonce$_B$), but seeded with the private keys that only Bob and only Alice know (Ke$_A$, Ke$_B$). Alice uses an embedded secret (architecturally invisible) KhA (and a nonce NKh$_{AB}$, i.e., a random number, sent previously by the CLA) to generate (via HMAC 1036) the key Ke$_A$. Thus, Ne$_A$ is a "signed" nonce. Alice can generate (via HMAC 1038) Bob's key Ke$_B$ from the CLA, which previously has sent an encrypted EKe$_B$. Alice decrypts it using the key Ke$_A$. The nonce Ne$_B$ is either concatenated or XOR-ed with Ne$_A$ and used as the input to a hash function (via HMAC 1040) to generate session key SK$_{AB}$.

The CLA thus sends both Bob and Alice nonces, authCodes, and, encrypted keys which can be used for all subsequent communications between the two parties. Even if these are intercepted, however, only Alice and Bob can correctly generate the shared session key SK$_{AB}$. The session key (SK$_{AB}$) is used by symmetric encryption blocks 1042 and 1044 to decrypt ciphertext and encrypt plaintext, as illustrated in FIG. 10. This method for generating the session key SK$_{AB}$ used for encrypting/decrypting plaintext/ciphertext during the session solves the perfect forward secrecy problem, with the assumption that the service (the CLA) is itself secure.

The man-in-the-middle problem is solved by hashing (via HMAC 1046) the session key $SK_{AB}$ with $Ke_B$ (which is Bob's key, generated similarly to $Ke_A$ but using Bob's embedded secret device key $Kh_B$ (not shown) and Bob's corresponding nonce $NKh_{BA}$ (not shown)). The result of the hash is the message digest ($MD_{AB}$). The message digest $MD_{AB}$ is sent after Alice receives $Nonce_B$ and performs the hash calculations. In this way, Bob can verify that he is speaking with Alice. Correspondingly, Alice receives $MD_{BA}$ (i.e., the hash of $Ke_A$ and $SK_{AB}$) from Bob and hashes (via HMAC 1048) the session key $SK_{AB}$ with $Ke_A$ to verify or authenticate that Alice is speaking with Bob. This functionality an also be used by Alice and Bob to sign messages to each other.

It is noted that this mechanism is easily linearly scaled. All that is required is an additional symmetric encryption and that the CLA provide the additional party's encrypted keys $Ke_x$.

Figure 11:
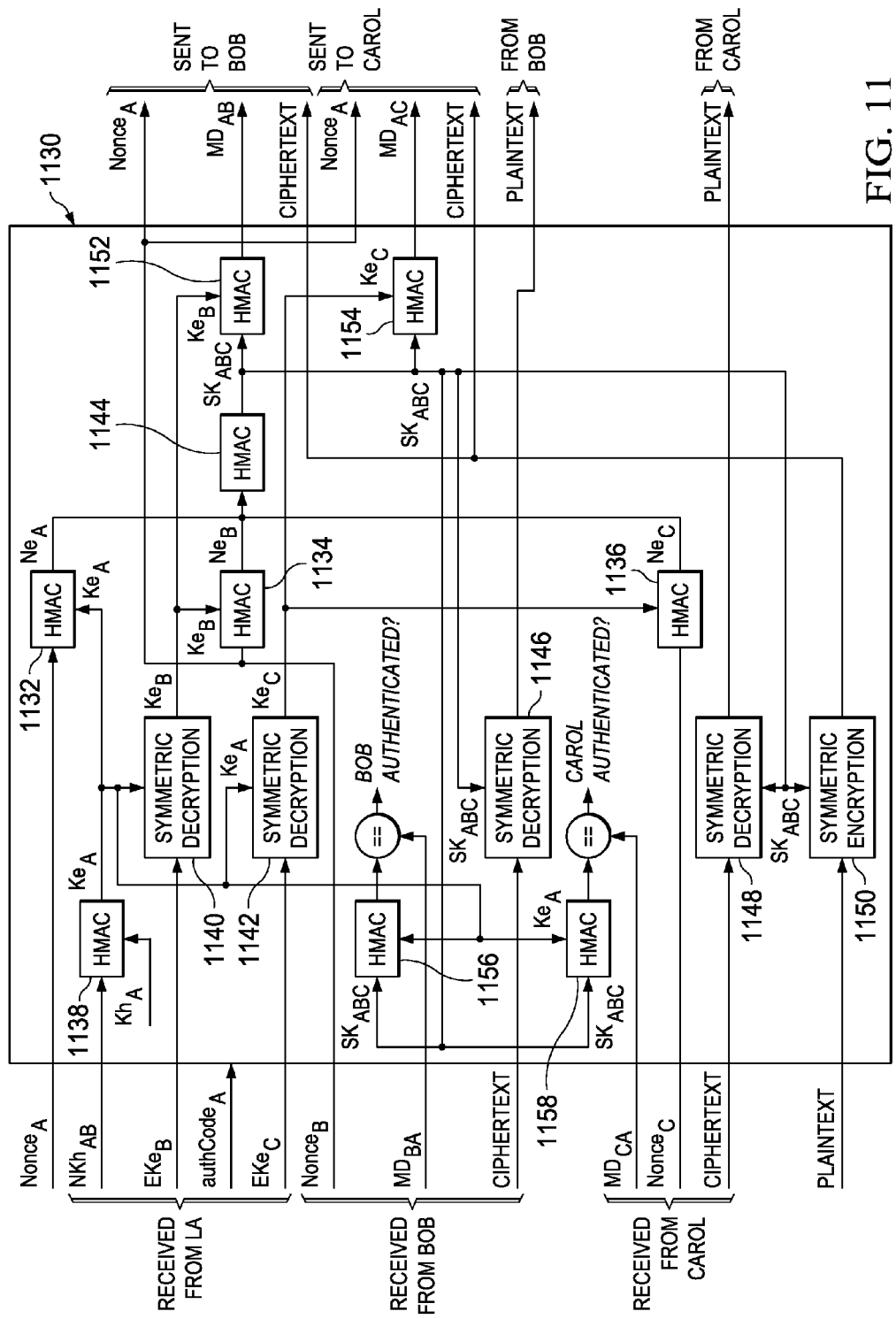
FIG. 11 depicts a 3-party secure AKE version of the protocol shown in FIG. 10.

An example of a three-party version of the SHAAKE protocol executing on an HSM module 1130 is shown in FIG. 11. FIG. 11 shows an example of how the protocol of FIG. 10 can be extended for Alice to communicate with Bob and Carol in a secure and private manner. Again, the overall execution environment for the protocol may be secured using a recursive security protocol. As shown, the CLA provides $authcode_A$, $NKh_{AB}$, $EKe_B$, and $EKe_C$. From Bob, Alice receives ciphertext as well as $Nonce_B$ and message digest $MD_{BA}$, while from Carol, Alice receives ciphertext, as well as Nonce and message digest $MD_{CA}$.

In operation, Alice sends Bob and Carol $Nonce_A$, Bob sends Alice $Nonce_B$, and Carol sends Alice $Nonce_C$. Alice passes $Nonce_A$, $Nonce_B$ and Nonce through HMACs (Hash Message Authentication Code, e.g., SHA functions) 1132, 1134, and 1136 respectively, to generate message digests $Ne_A$, $Ne_B$, and $Ne_C$. These message digests are hashes of the nonces ($Nonce_A$, $Nonce_B$ and $Nonce_C$), but seeded with the private keys that only Bob, Alice, and Carol know ($Ke_A$, $Ke_B$, $Ke_C$). Alice uses an embedded secret (architecturally invisible) KhA (and a nonce $NKh_{AB}$, i.e., a random number, sent previously by the CLA) to generate (via HMAC 1138) the key $Ke_A$. Thus, $Ne_A$ is a "signed" nonce. Alice can generate (via HMAC 1140) Bob's key $Ke_B$ from the CLA, which previously has sent an encrypted $EKe_B$. Alice can also generate (via HMAC 1142) Carol's key $Ke_C$ from the CLA, which previously has sent an encrypted $EKe_C$. Alice decrypts both using the key $Ke_A$. The nonces $Ne_A$, $Ne_B$ and $Ne_C$ are hashed (via HMAC 1144) to generated session key $SK_{ABC}$.

The CLA thus sends Bob, Alice, and Carol nonces, authCodes, and encrypted keys which can be used for all subsequent communications between the three parties. Even if these are intercepted, however, only Alice, Bob, and Carol can generate their session keys $SK_{ABC}$. The session key ($SK_{ABC}$) is used by symmetric encryption blocks 1146, 1148, and 1150 to decrypt ciphertext and encrypt plaintext, as illustrated in FIG. 11. This method for generating the session key $SK_{ABC}$ used for encrypting/decrypting plaintext/ciphertext during the session solves the perfect forward secrecy problem.

As with the example shown in FIG. 10, the man-in-the-middle problem is solved by hashing (via HMAC 1152 and HMAC 1154, respectively) the session key $SK_{ABC}$ with $Ke_B$ and $Ke_C$. The result of these hashes are the message digests ($MD_{AB}$ and $MD_{AC}$). The message digests $MD_{AB}$ and $MD_{AC}$ are sent after Alice receives $Nonce_B$ and $Nonce_C$ and performs the hash calculations. In this way, Bob and Carol can each verify that they are speaking with Alice. Correspondingly, Alice receives $MD_{BA}$ and $MD_{CA}$ from Bob and Carol and hashes (via HMAC 1156 and 1158) the session key $SK_{ABC}$ with $Ke_A$ to verify or authenticate that Alice is speaking with Bob or Carol. This functionality an also be used by Alice, Bob and Carol to sign messages to each other.

Figure 12:
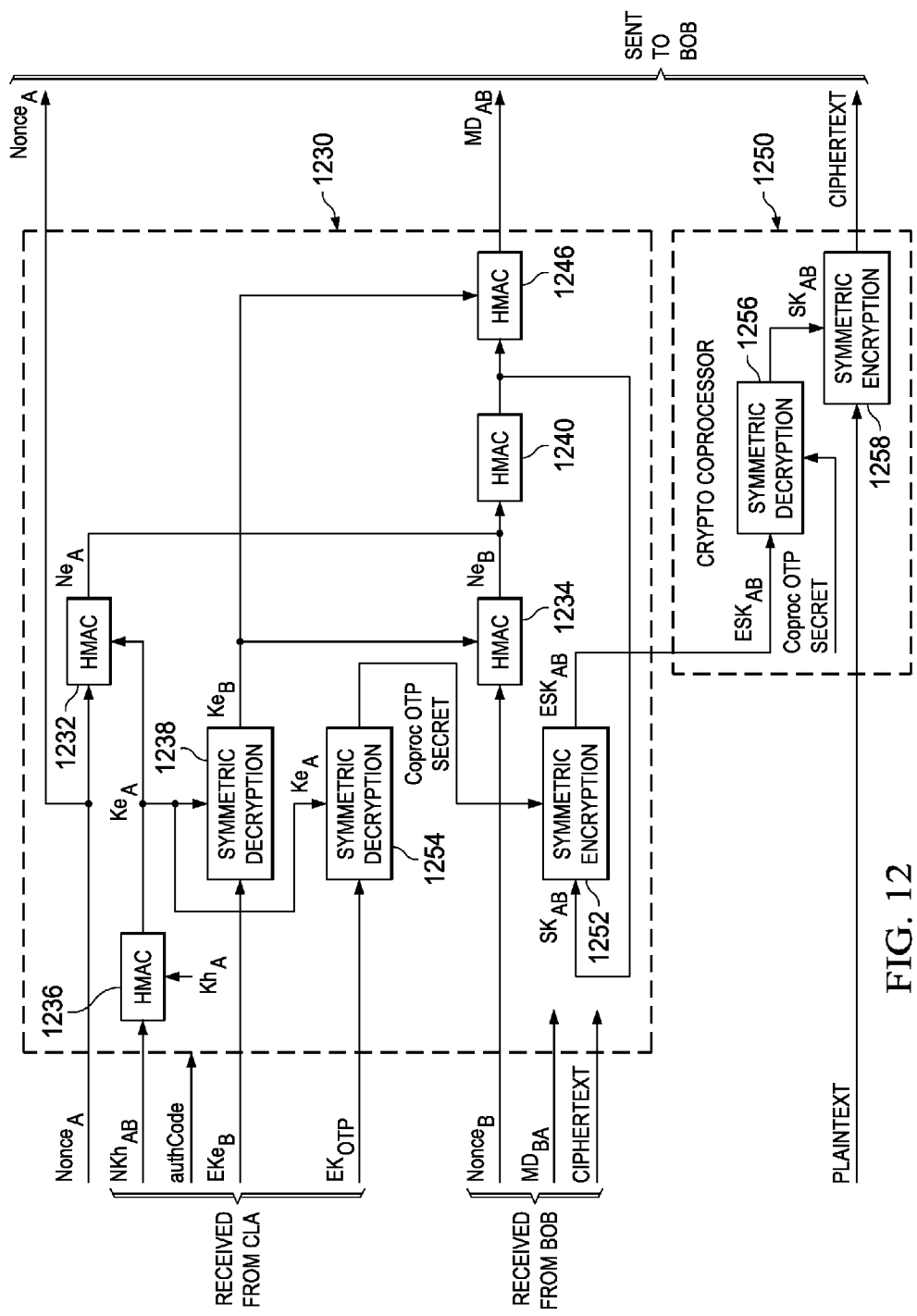
FIG. 12 depicts an embodiment of the protocol shown in FIG. 10, but using an HSM module as an accelerator for bulk message encryption and decryption processing.

Referring back to FIG. 10, the process described for generating session key $SK_{AB}$ has to be performed once per session. Once the session key is generated, text is encrypted and decrypted without regenerating the session key. Therefore, the bulk of the processing in FIG. 10 is performed by the symmetric decryption and encryption blocks 1042 and 1044. FIG. 12 illustrates an embodiment that boosts performance by implementing the symmetric decryption and encryption blocks in a crypto co-processor.

FIG. 12 is a diagram of an embodiment in which a crypto co-processor is used for encryption/decryption of text. FIG. 12 shows an HSM module 1230 that is similar to the module shown in FIG. 10. In general, the blocks 1232, 1234, 1236, 1238, 1240, and 1246 operating in the same manner as the corresponding blocks in FIG. 10, to generate session key $SK_{AB}$ and message digest $MD_{AB}$. The HSM module 1230 performs key exchange in a manner similar to that described with reference to FIG. 10. However, the actual encryption of the plaintext is performed using a separate crypto co-processor 1250 (for clarity, a decryption block is not shown). The crypto coprocessor receives an encrypted session key $ESK_{AB}$, which is a version of the session key $SK_{AB}$ that is encrypted (via symmetric encryption block 1252) using the coprocessor OTP secret key. The coprocessor OTP secret key is generated from $EK_{OTP}$ and $Ke_A$ via symmetric decryption block 1254. In the crypto coprocessor 1250, the session key $SK_{AB}$ is decrypted using decryption block 1256. Symmetric encryption block 1258 uses the session key to encrypt the plaintext. A similar decryption block (not shown) uses the session key to decrypt ciphertext.

Although the invention has been described with respect to specific embodiments thereof, these embodiments are merely illustrative, and not restrictive of the invention. The description herein of illustrated embodiments of the invention, including the description in the Summary, is not intended to be exhaustive or to limit the invention to the precise forms disclosed herein (and in particular, the inclusion of any particular embodiment, feature or function within the Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout the claims that follow, the meaning of "in" includes "in" and "on" unless the context clearly dictates otherwise.

What is claimed is:

1. A method of providing secure communications between a local device and a remote device comprising:
   the local device receiving a nonce from a third party wherein the nonce from the third party is derived from a private key of the local device and a private key of the remote device;
   the local device receiving an encrypted key from the third party, wherein the encrypted key from the third party is derived from the private key of the remote device;
   generating a session key using the nonce, the encrypted key from the third party, and an embedded secret of the local device;
   using the generated session key to symmetrically encrypt and decrypt communications between the local device and the remote device;
   the local device receiving a message digest from the remote device, wherein the message digest from the remote device is derived from the session key and the private key of the local device; and
   authenticating the remote device by comparing the received message digest from the remote device with an output of a hash function of the session key and the private key of the local device.

2. The method of claim 1, further comprising using the nonce and the embedded secret to generate the private key of the local device.

3. The method of claim 2, wherein the private key of the local device is generated by running the nonce and the embedded secret through the hash function.

4. The method of claim 3, wherein the hash function is implemented in hardware.

5. The method of claim 1, wherein the symmetrical encryption and decryption is implemented in hardware.

6. The method of claim 1, wherein the symmetrical encryption and decryption is implemented using a cryptographic co-processor.

7. The method of claim 1, wherein the private key of the local device is generated using the hash function with the nonce as an input and the embedded secret of the local device as a key.

8. The method of claim 1, further comprising:
   the local device generating a first nonce;
   the local device receiving a second nonce from the remote device;
   the local device passing the first nonce and the second nonce through the hash function to generate first and second message digests; and
   wherein the session key is generated by passing the first and second message digests through the hash function.

9. The method of claim 1, further comprising providing secure communications between the local device, the remote device, and a second remote device.

10. The method of claim 1, wherein generating a session key is implemented in software.

11. The method of claim 1, wherein using the generated session key to symmetrically encrypt and decrypt communications between the local device and the remote device is implemented in software.

12. The method of claim 1, wherein the third party is a licensing authority.

13. A computer program product comprising at least one non-transitory computer-readable storage medium storing computer instructions translatable by one or more processors to perform:

receiving a nonce from a third party, wherein the nonce from the third party is derived from a private key of a local device and a private key of a remote device;

receiving an encrypted key from the third party, wherein the encrypted key from the third party is derived from the private key of the remote device;

generating a session key using the nonce, the encrypted key from the third party, and an embedded secret of the local device;

using the generated session key to symmetrically encrypt and decrypt communications between the local device and the remote device;

receiving a message digest from the remote device, wherein the message digest from the remote device is derived from the session key and the private key of the local device; and authenticating the remote device by comparing the received message digest from the remote device with an output of a hash function of the session key and the private key of the local device.

14. The computer program product of claim 13, wherein the symmetrical encryption and decryption is implemented using a cryptographic co-processor.

15. A hardware security module comprising:
a processor; and
at least one non-transitory computer-readable storage medium storing computer instructions translatable by the processor to perform:
  receiving a nonce from a third party, wherein the nonce from the third party is derived from a private key of a local device and a private key of a remote device;
  receiving an encrypted key from the third party, wherein the encrypted key from the third party is derived from the private key of the remote device;
  generating a session key using the nonce, the encrypted key from the third party, and an embedded secret of the local device;
  using the generated session key to symmetrically encrypt and decrypt communications between the local device and the remote device;
  receiving a message digest from the remote device, wherein the message digest from the remote device is derived from the session key and the private key of the local device; and
  authenticating the remote device by comparing the received message digest from the remote device with an output of a hash function of the session key and the private key of the local device.

16. The hardware security module of claim 15, further comprising a cryptographic co-processor, wherein the symmetrical encryption and decryption is implemented using the cryptographic co-processor.

17. The hardware security module of claim 15, further comprising using the nonce and the embedded secret to generate the private key of the local device.

18. The hardware security module of claim 17, wherein the private key of the local device is generated by running the nonce and the embedded secret through the hash function.

19. The hardware security module of claim 18, wherein the hash function is implemented in hardware or the symmetrical encryption and decryption is implemented in hardware.

20. The hardware security module of claim 15, wherein the private key of the local device is generated using a hash function with the nonce as an input and the embedded secret of the local device as a key.

21. The hardware security module of claim 15, wherein using the generated session key to symmetrically encrypt and decrypt communications between the local device and the remote device is implemented in software.

22. A method of providing secure communications between a local device and a remote device comprising:
the local device receiving a first nonce from a third party wherein the nonce from the third party is derived from a private key of the local device and a private key of the remote device;
the local device receiving an encrypted key from the third party, wherein the encrypted key from the third party is derived from the private key of the remote device;
generating a session key using the nonce, the encrypted key from the third party, and an embedded secret of the local device;
using the generated session key to symmetrically encrypt and decrypt communications between the local device and the remote device;
the local device generating a second nonce;
the local device receiving a third nonce from the remote device;
the local device passing the second nonce and the third nonce through a hash function to generate first and second message digests; and
wherein the session key is generated by passing the first and second message digests through the hash function.

23. The method of claim 22, further comprising using the nonce and the embedded secret to generate the private key of the local device.

24. The method of claim 23, wherein the private key of the local device is generated by running the nonce and the embedded secret through the hash function.

25. The method of claim 24, wherein the hash function is implemented in hardware or the symmetrical encryption and decryption is implemented in hardware.

26. The method of claim 22, wherein the private key of the local device is generated using the hash function with the nonce as an input and the embedded secret of the local device as a key.

27. The method of claim 22, wherein using the generated session key to symmetrically encrypt and decrypt communications between the local device and the remote device is implemented in software.

28. A hardware security module comprising:
a processor; and
at least one non-transitory computer-readable storage medium storing computer instructions translatable by the processor to perform:
  receiving a nonce from a third party, wherein the nonce from the third party is derived from a private key of a local device and a private key of a remote device;
  receiving an encrypted key from the third party, wherein the encrypted key from the third party is derived from the private key of the remote device;
  generating a session key using the nonce, the encrypted key from the third party, and an embedded secret of the local device;
  using the generated session key to symmetrically encrypt and decrypt communications between the local device and the remote device;
  the local device generating a second nonce;
  the local device receiving a third nonce from the remote device;
  the local device passing the second nonce and the third nonce through a hash function to generate first and second message digests; and wherein the session key is generated by passing the first and second message digests through the hash function.

29. The hardware security module of claim 28, further comprising using the nonce and the embedded secret to generate the private key of the local device.

30. The hardware security module of claim 29, wherein the private key of the local device is generated by running the nonce and the embedded secret through the hash function.

31. The hardware security module of claim 30, wherein the hash function is implemented in hardware or the symmetrical encryption and decryption is implemented in hardware.

32. The hardware security module of claim 28, wherein the private key of the local device is generated using a hash function with the nonce as an input and the embedded secret of the local device as a key.

33. The hardware security module of claim 28, wherein using the generated session key to symmetrically encrypt and decrypt communications between the local device and the remote device is implemented in software.

* * * * *